United States Patent [19]
Yamanashi

[11] Patent Number: 5,241,420
[45] Date of Patent: Aug. 31, 1993

[54] ZOOM LENS SYSTEM
[75] Inventor: Takanori Yamanashi, Tokyo, Japan
[73] Assignee: Olympus Optical Co., Ltd., Tokyo, Japan
[21] Appl. No.: 622,538
[22] Filed: Dec. 5, 1990
[30] Foreign Application Priority Data Dec. 6, 1989 [JP] Japan .................. 1-315332

[51] Int. Cl.$^5$ ........................... G02B 15/14
[52] U.S. Cl. .................. 359/682; 359/676; 359/684; 359/695
[58] Field of Search ......... 359/676, 682, 695, 683, 359/687, 677, 684, 689

[56] References Cited

U.S. PATENT DOCUMENTS

| | | | |
|---|---|---|---|
| 4,094,586 | 6/1978 | Sato et al. | 359/683 |
| 4,380,377 | 4/1983 | Sato et al. | 359/683 |
| 4,456,341 | 6/1984 | Kato | 359/683 |
| 4,636,040 | 1/1987 | Tokumaru | 359/684 |
| 4,749,265 | 6/1988 | Hattori et al. | 359/683 |
| 4,789,229 | 12/1988 | Yamanashi | 380/427 |
| 4,830,477 | 5/1989 | Takahashi et al. | 359/683 |
| 4,840,468 | 6/1989 | Tanaka | 359/684 |
| 4,844,600 | 7/1989 | Tokumaru | 359/684 |
| 4,854,685 | 8/1989 | Corbasson | 359/683 |
| 5,061,051 | 10/1991 | Miyamae | 359/676 |

FOREIGN PATENT DOCUMENTS 62-209508  9/1987  Japan .

Primary Examiner—Bruce Y. Arnold
Assistant Examiner—Hung Xuan Dang
Attorney, Agent, or Firm—Cushman, Darby & Cushman

[57] ABSTRACT

A zoom lens system comprising, in the order from the object side, a first lens unit having a positive refractive power, a second lens unit having a negative refractive power, a third lens unit having a positive refractive power, a fourth lens unit having a positive refractive power and a fifth lens unit having a negative refractive power, adapted so as to vary the focal length by moving said first through fourth lens units independently while keeping said fifth lens unit fixed, and adapted so as to perform focusing by moving at least one of said second through fifth lens units. This zoom lens system has a high vari-focal ratio, a wide field angle, a compact size, and optical performance stabilized regardless of zooming and focusing.

11 Claims, 29 Drawing Sheets

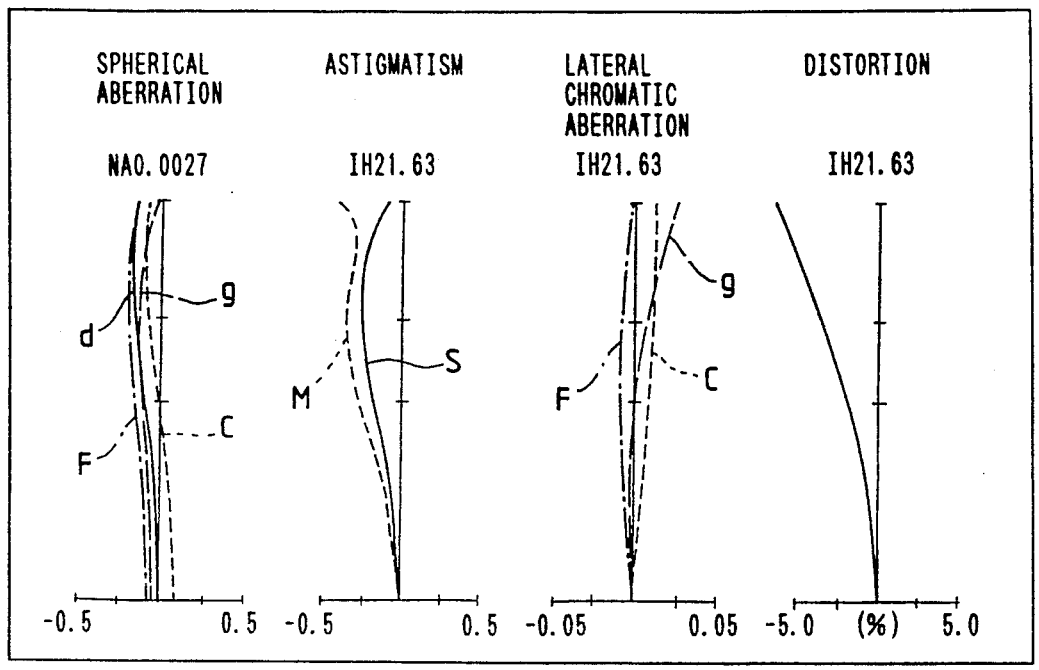
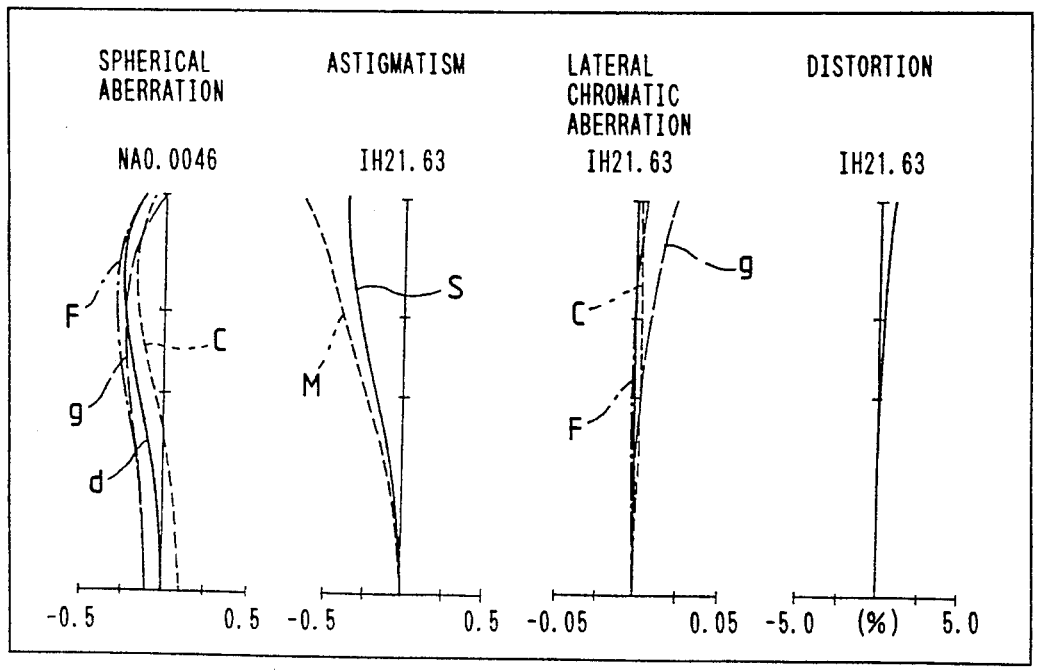

ZOOM LENS SYSTEM

BACKGROUND OF THE INVENTION a) Field of the Invention

The present invention relates to a compact zoom lens system which has favorable optical performance.

b) Description of the Prior Art

In the recent years, zoom lens systems have vari-focal ratios of 2 and higher, and made compact optically by strengthening refractive powers of the lens elements used therein and mechanically by adopting collapsing mechanisms utilizing dead spaces remaining in the lens systems. These designs make it possible to satisfy the basic demands for imaging systems, concretely portability, operability and so on. Since zoom lens systems having long total lengths and large outside diameters inevitably enlarge lens barrels to be used therewith, it is desired to design compacter zoom lens systems so far as they are not to be used in special fields of application and the compacter design of a lens system constitutes an important requirement especially in a case where an optical system is to be incorporated in a photographing system.

The inventor proposed, by Japanese Patent Kokai Publication No. Sho 62-209508 (U.S. Pat. No. 4,789,229), a zoom lens system which has a high zooming ratio. One of the object of the invention disclosed by U.S. Pat. No. 4,789,229 was to compose a zoom lens system of lens elements which are not larger than required without degrading optical performance thereof. In other words, there lies a certain limit in the attempt to make a lens system compacter by strengthening refractive powers of the lens units to compose said lens system since the strengthening the refractive powers of the lens units makes it necessary to impose stricter manufacturing allowance on the lens elements which are to compose the lens elements, whereby the lens elements can hardly be manufactured in practice. For this reason, another object of the above-mentioned patent was to make the zoom lens system lens susceptible to manufacturing errors of the lens elements.

It is conventionally considered that compact design of an optical system is conflicting with enhancement of optical performance thereof, and one of the problems on lens design is to properly balance compact design with optical performance.

In selecting a refractive power distribution which is determined by refractive powers of lens units, i.e., partial lens systems, and distance between principal points, refractive powers of the lens units are to be strengthened for designing a lens system compact, but correction of aberrations becomes difficult when the lens units are composed of thick lens elements. Further, when the distance between the principal points of each of the lens units is shortened for designing the lens system compact, it is obliged to select a number of lens elements which imposes no restriction on arrangement of thick lens elements in each of the lens units. When each of the lens units is composed of a small number of lens elements, correction of aberrations becomes difficult and the lens elements must be manufactured with higher precision. In order to correct aberrations with a small number of lens elements, it is obliged to adopt aspherical surfaces and graded refractive index lens elements. However, aspherical surfaces and graded refractive index lens elements are to be used for improving optical performance, and cannot modify the principle of lens designs. Accordingly, the use of aspherical surfaces and graded refractive index lens element inevirably makes it necessary to specify stricter manufacturing precision or requires more sophisticated manufacturing techniques.

SUMMARY OF THE INVENTION

A primary object of the present invention is to provide a compact zoom lens system which is designed so as to have favorable optical performance without strengthening refractive powers of the lens units composing said lens system by adopting a zooming system having flexibility and selecting an adequate refractive power distribution for the lens units.

Another object of the present invention is to provide a compact zoom lens system which has favorable optical performance and aberrations varied little by focusing said lens system by improving the zooming lens system disclosed by U.S. Pat. No. 4,789,229 so as to have a zooming system having flexibility and selecting optimum arrangement of thick lens elements in the lens units composing said lens system.

The zoom lens system according to the present invention is designed so as to have a wide field angle within the wide field angle region as the wide position thereof, a vari-focal ratio on the order of 4 which is frequently selected for practical use, a compact design, excellent optical performance, low susceptibility to manufacturing errors of the lens elements used therein and the composition described below. That is to say, the zoom lens system according to the present invention of a fundamental type thereof comprises, in the order from the object side, a first lens unit having a positive refractive power, a second lens unit having a negative refractive power, a third lens unit having a positive refractive power, a fourth lens unit having a positive refractive power and a fifth lens unit having a negative refractive power. For varying focal length of the zoom lens system from the wide position to the tele position thereof, the first through fourth lens units are moved independently along the optical axis, thereby enhancing flexibility for correction of aberrations and minimizing moving distance for each of the lens units in the zoom lens system according to the present invention. The fifth lens unit is fixed for the variation of the focal length of the zoom lens system.

Further, at least one of the second through fifth lens units is movable along the optical axis for focusing the zoom lens system.

One of characteristics of the zoom lens system according to the present invention lies in the fact that the first through fourth lens units out of the five lens units are moved for varying the focal length of the zoom lens system and at least one of the second through fifth lens untis is moved for focusing the zoom lens system as described above. Some of the first through fourth lens units may be fixed for varying the focal length of the zoom lens system and the first lens unit may be moved together with at least one of the second through fifth lens units for focusing the zoom lens system.

FIG. 33 and FIG. 34 exemplify moving loci of the lens units for varying the focal length of the zoom lens system according to the present invention. FIG. 33 shows loci for moving all of the first through fourth lens units, whereas FIG. 34 shows an example wherein the second lens unit is fixed for varying the focal length of the zoom lens system and an advantage to permit simplifing structure of a lens barrel is obtainable. Further, it is possible to linearly move the fourth lens unit and so on.

In addition to the characteristic in the composition described above, another characteristic of the zoom lens system according to the present invention lies in that it satisfies the following conditions (1), (2) and (3):

$$0.1 < |f_2/f_1| < 0.4 \qquad (1)$$

$$0.5 < |\beta_{3W} \cdot \beta_{4W}| < 2.5 \qquad (2)$$

$$1.0 < \beta_5 < 1.3 \qquad (3)$$

wherein the reference symbols $f_1$ and $f_2$ represent the focal lengths of the first lens unit and the second lens unit respectively, the reference symbols $\beta_{3W}$ and $\beta_{4W}$ designate the lateral magnifications of the third lens unit and the fourth lens unit respectively at the wide position, and the reference symbol $\beta_5$ denotes the lateral magnification of the fifth lens unit.

The zoom lens system according to the present invention is based on a zooming system permitting obtaining a high vari-focal ratio reasonably, and designed so at to allow speedy focusing without degrading optical performance of the lens system.

Selection of roles for lens units is important for determining paraxial power distribution among lens units in a zoom lens system. Further, it is possible to determine a paraxial power distribution so as to obtain a high vari-focal ratio when a zoom lens system is composed of two or more lens units. When the zoom lens system is composed of two lens units, however, only one of the lens units is moved for varying the focal length of the zoom lens system and the lens unit must be moved for a long distance, thereby making it difficult to correct the variations of aberrations caused by moving the lens unit for a long distance.

The zoom lens system according to the present invention which is composed of the five lens units can be considered that it is composed of two subsystems, i.e., an afocal zoom converter subsystem consisting of the first lens unit, the second lens unit and the third lens unit, and another subsystem consisting of the fourth lens unit and the fifth lens unit. In this case, magnification of the subsystem consisting of the first through third lens units is progressively enhanced from the wide position toward the tele position.

When the first through third lens units compose a nearly afocal system, the relationship expressed by the following formula (i) establishes among the focal lengths (refractive powers) of the first lens unit, the second lens unit and the third lens unit, and zooming is performed by varying the distance between the principal points while satisfying this relationship:

$$\phi_3 \fallingdotseq \frac{-\{\phi_1 + \phi_2(1 - e_1)\}}{(1 - e_1') - \{\phi_1 + \phi_2(1 - e_1')\}e_2'} \qquad (i)$$

wherein the reference symbols $\phi_1$, $\phi_2$ and $\phi_3$ represent the refractive powers of the first lens unit, the second lens unit and the thrid lens unit respectively, the reference symbol $e_1'$ designates the distance between the principal points of the first lens unit and the second lens unit, and the reference symbol $e_2'$ denotes the distance between the principal points of the second lens unit and the third lens units.

In addition, values of $e_1'$ and $e_2'$ are varied by zooming.

The above-mentioned formula (i) defines the condition for determining the refractive power of the third lens units so as to compose an afocal system of the first through third lens units when the refractive powers of the first lens unit and the second lens unit are given. In practice, however, it is desirable to compose a nearly afocal system of the first through third lens units since a restricting condition is constituted by the attempts to satisfy the formula (i) and correct aberrations favorably over an entire vari-focal range. The vari-focal function of the first through third lens units serves as a converter for widening field angle at the wide position and as a converter for prolonging focal length at the tele position. When a nearly afocal system is composed of the first through third lens units, relationship among the magnifications of the lens units is expressed approximately by the following formulae (ii) and (iii):

$$\left.\begin{array}{l}\gamma_W \fallingdotseq (\tan u_{1W})/(\tan u_{3W}) \\ \gamma_T \fallingdotseq (\tan u_{1T})/(\tan u_{3T})\end{array}\right\} \qquad (ii)$$

$$\gamma_W < \gamma_T \qquad (iii)$$

wherein the reference symbol $\gamma_W$ represents the angular magnification of the nearly afocal system composed of the first through third lens units at the wide position, the reference symbol $\gamma_T$ designates the angular magnification of the nearly afocal system composed of the first through third lens units at the tele position, the reference symbol $u_{1W}$ denotes the inclination angle of incidence of the marginal principal ray at the wide position, the reference symbol $u_{3W}$ represents the angle of emergence of the marginal principal ray at the wide position, the reference symbol $u_{1T}$ designates the angle of incidence of the marginal principal ray at the tele position and the reference symbol $u_{3T}$ denotes the angle of emergence of the marginal principal ray at the tele position.

As is understood from the formula (iii), the angular magnification at the tele position must be higher than that at the wide position.

On the other hand, the fourth lens unit and the fifth lens units can be regarded as imaging lenses in the zoom lens system according to the present invention. Accordingly, location of the image point of the lens system can be expressed by the following formula (iv) based on the paraxial theory when the above-mentioned formula (i) nearly establishes, and calculated only with refractive power distribution between the fourth lens unit and the fifth lens unit:

$$S_5' \fallingdotseq (1 - \phi_4 e_4')/\{\phi_4 + \phi_5(1 - \phi_4 \cdot e_4')\} \qquad (iv)$$

wherein the reference symbol $S_5'$ represents the paraxial back focal length, the reference symbols $\phi_4$ and $\phi_5$ designate the refractive powers of the fourth lens unit and the fifth lens unit respectively, and the reference symbol $e_4'$ denotes the distance between the principal points of the fourth lens unit and the fifth lens unit.

According to the above-mentioned formula (iv), it is possible to distribute refractive power between the fourth lens unit and the fifth lens unit in the zoom lens system while reserving the required back focal length.

On the other hand, focal length of the zoom lens system as a whole can be calculated by the following formula (v) on the basis of the refractive power distribution among all of the lens units including the first lens unit, the second lens unit and the third lens unit in the lens system as a whole.

$$f = \frac{1}{\{(1-e_1') -(\phi_1 + \phi_2(1-e_1')e_2'\}\{\phi_4 + \phi_5(1-\phi_4 \cdot e_4')\}} \quad (v)$$

In Embodiment 1 of the zoom lens system according to the present invention which is to be described later, for example, paraxial refractive powers are distributed, and the paraxial and axial rays travel as illustrated in FIG. 35.

For the zoom lens system according to the present invention, refractive power distribution can be determined as described above.

Now, description will be made on a requirement for enhancing vari-focal ratio and shorten total length of the zoom lens system according to the present invention.

This requirement is related to the vari-focal function to be shared among the lens units.

In the zoom lens system according to the present invention, the fifth lens unit has no vari-focal function, whereas the first through fourth lens units have relations to the variation of the focal length of the zoom lens system, and the following formula establishes:

$$\beta_{2W} \cdot \beta_{3W} \cdot \beta_{4W} < \beta_{2T} \beta_{3T} \beta_{4T} \quad (vi)$$

wherein the reference symbols $\beta_{2W}$, $\beta_{3W}$ and $\beta_{4W}$ represent the lateral magnifications of the second lens unit, the third lens unit and the fourth lens unit respectively at the wide position, and the reference symbols $\beta_{2T}$, $\beta_{3T}$ and $\beta_{4T}$ designates the lateral magnifications of the second lens unit, the third lens unit and the fourth lens unit respectively at the tele position.

Further, the following relations establish in the zoom lens system according to the present invention:

$$|\beta_{2W}| - |\beta_{2T}| < 0 \; \beta_2 < 0 \quad (vii)$$

$$|\beta_{3W} \cdot \beta_{4W}| - |\beta_{3T} \beta_{4T}| < 0 \; \beta_3 \cdot \beta_4 < 0 \quad (viii)$$

fourth lens unit. If the lower limit of the condition (2) is exceeded, an unreasonable burden of magnification will be imposed on the second lens unit and the first lens unit may be moved undesirably along a non-linear locus. If the upper limit of the condition (2) is exceeded, in contrast, the third lens unit or the fourth lens unit must be moved for a long distance, thereby resulting in effects undesirable for correcting aberrations with good balance and shortening total length of the zoom lens system.

Further, in the zoom lens system according to the present invention, the fifth lens unit which has a fixed magnification is designed so as to have a negative focal length and a magnification larger than 1x, and the system composed of the first through fourth lens units has a short total focal length for contribution to the compact design of the zoom lens system.

Now, description will be made on paraxial refractive power distribution among the lens units to be determined while taking correction of aberrations into consideration.

In the zoom lens system according to the present invention, all the lens units other than the fifth lens unit contribute to variation of the focal length of the zoom lens system. In order to simplify the zooming mechanism, it is possible to move the first through fourth lens units integrally or keep the second lens unit always fixed. In order to obtain sufficiently satisfiable optical performance of the zom lens system which is designed compact, however, it is desirable that all the first through fifth lens units are movable with no restriction, and such movements of the lens units will enable delicate correction of the image surface.

The present invention selects a zooming system and a paraxial refractive power distribution which permit, shortening the total length of the zoom lens system and preventing the refractive powers of the lens units from being strengthened.

For reference, the total lengths, refractive powers, etc. of the conventional zoom lens systems having vari-focal ratios on the order of 3 to 6 are listed in the following table:

TABLE

|   |   | f | $\phi_1$ | $e_1'$ | $\phi_2$ | $e_2'$ | $\phi_3$ | $e_3'$ | $\phi_4$ | $e_4'$ | Total length of thin lens system |
|---|---|---|---|---|---|---|---|---|---|---|---|
| a | W | 35.89 | 0.01530 | 9.472 | −0.06308 | 21.898 | 0.02296 | 26.217 | 0.01624 | 60.657 | 118.244 |
|   | T | 102.95 |  | 29.188 |  | 8.681 |  | 19.717 |  | 80.567 | 138.153 |
| b | W | 35.06 | 0.00867 | 10.284 | −0.04096 | 39.031 | 0.02817 |  |  | 71.161 | 120.476 |
|   | T | 105.6 |  | 49.304 |  | 19.501 |  |  |  | 91.057 | 159.862 |
| c | W | 35.96 | 0.00914 | 8.893 | −0.03574 | 46.910 | 0.01079 | −3.282 | 0.01462 | 72.806 | 125.327 |
|   | T | 132.0 |  | 53.063 |  | 16.900 |  | −7.492 |  | 86.628 | 149.1 |
| d | W | 36.22 | 0.01568 | 7.456 | −0.05927 | 24.637 | 0.023614 | 29.674 | 0.013613 | 57.77 | 119.537 |
|   | T | 130.24 |  | 29.756 |  | 5.727 |  | 22.334 |  | 83.844 | 141.661 |
| e | W | 36.0 | 0.011587 | 8.947 | −0.04082 | 44.0 | 0.024601 | 29.41 | 0.00285 | 46.3343 | 128.691 |
|   | T | 130.76 |  | 37.217 |  | 14.94 |  | 58.47 |  | 46.3393 | 156.966 | wherein the reference symbols $\beta_2$, $\beta_3$ and $\beta_4$ represent the lateral magnifications of the second lens unit, the third lens unit and the fourth lens unit respectively.

That is to say, a function to enhance magnification of the zoom lens system from the wide position toward the tele position is imposed on the lateral magnification of the second lens unit and the product obtained by multiplying the lateral magnification of the third lens unit by that of the fourth lens unit.

The condition (2) is related to this function and defines the product of the lateral magnification of the third lens unit multiplied by the lateral magnification of the fourth lens unit. If the lower limit of the condition (2) is wherein the reference symbols $\phi_1$, $\phi_2$, $\phi_3$ and $\phi_4$ represent the refractive powers of the first, second, third and fourth lens units respectively, the reference symbols $e_1'$, $e_2'$, $e_3'$ and $e_4'$ designate the distances between the first lens unit and the second lens unit, between the second lens unit and the third lens unit, between the third lens unit and the fourth lens unit, and between the fourth lens unit and the fifth lens unit respectively, and the reference symbol L denotes the total length of the lens system composed of thin lens elements.

Out of the zoom lens systems listed in the above table, the zoom lens system a and the zoom lens system b have vari-focal ratios which are nearly equal to each other. However, the lens units, especially the first lens unit, of the zoom lens system a which has the shorter total length L have refractive powers stronger than those of the lens units used in the zoom lens system b which has the longer total length. Among the zoom lens systems c, d and e which have vari-focal ratios nearly equal to one another, the zoom lens system d has the longest total length and the lens units of this zoom lens system have refractive powers stronger than those of the lens units used in the zoom lens systems c and d.

The comparison of the paraxial refractive power distributions of the conventional zoom lens systems described above clarifies that a little shortening of a total length of a zoom lens system results in strengthening of refractive powers of the lens units composing said zoom lens system. Accordingly, a compacter design of a zoom lens system results in strengthening refractive powers of the lens units and makes it more difficult to correct aberrations in the zoom lens system, thereby making it necessary to impose stricter centering precision and requiring higher cost at manufacturing stage.

The present invention specifies the refractive power of the first lens unit within a certain predetermined range and the condition (1) defines the refractive power of the second lens unit as a ratio relative to the refractive power of the first lens unit selected within said range. The refractive power of the second lens unit is strengthened within range wherein the condition (1) is satisfied so as to make the zoom lens system compact.

If the lower limit of the condition (1) is exceeded, an advantage will be obtained for making the zoom lens system compacter, but correction of aberrations will undesirably be difficult. If the upper limit of the condition (1) is exceeded, in contrast, the zoom lens system will undesirably be large.

In order to prevent aberrations from being varied remarkably by varying focal length and stabilize spherical aberration at the tele position, it is desirable to use a lens element made of an extraordinarily dispersive material in the first lens unit.

Further, when the second lens unit is to have a strong refractive power, it should desirably have a surface which produces aberrations of high orders and be designed as a type which is advantageous for correcting coma. Furthermore, it is significant for reducing the outside diameter of the first lens unit to compose the second lens unit of a small number of lens elements.

The refractive power of the third lens unit is determined almost from the relationship expressed by the formula (i). The third lens unit is important for favorably correcting aberrations in the zoom lens system, need not be composed of a large number of lens elements and should desirably comprise an air lens for making the zoom lens system compact.

The fourth lens unit has a role to focus the nearly afocal rays emerging from the nearly afocal lens system composed of the first through third lens units, and should have a composition which does not degrade balance in powers and consisting of easily manufacturable lens elements. The fourth lens unit is composed of three positive, positive and negative lens elements in certain embodiments of the present invention or four positive, negative, positive and positive lens elements in the other embodiments of the present invention.

The fifth lens unit has a refractive power which is weaker than that of the second lens unit and negative like that of the second lens unit. The fifth lens unit has a role for correcting aberrations as well as a role as a magnifying lens system. Since it is considered that the aberrations remaining in the first through fourth lens units are magnified by the longitudinal magnification of the fifth lens unit, this lens unit is important for balancing aberrations in the zoom lens system as a whole. With reference to the embodiments of the present invention which are to be described later, description will be made on the functions of the fifth lens unit for quality and condition of the image formed by the first through fourth lens units.

FIG. 36, FIG. 37 and FIG. 38 illustrate aberration curves which visualize imaging performance of the lens system composed of the first through fourth lens units adopted in the Embodiment 1 of the present invention at the wide position, intermediate focal length and tele position thereof respectively. As is seen from these curves, astigmatism is rather undercorrected in the lens system. Further, FIG. 39 shows modulation transfer functions of this lens system for the white light. In this drawing, the curves are traced taking the optimum paraxial image surface as standard. This lens system allows remarkable curvature of field and has insufficient imaging performance for the offaxial rays as shown in FIG. 39. Modulation transfer functions of the zooming lens system as a whole comprising the fifth lens unit are shown in FIG. 40, in which flatness of the image surface is remarkably improved. This fact clarifies that the fifth lens units has a function to correct the image surface. In addition, aberration characteristics of the Embodiment 1 of the present invention are illustrated in FIG. 9, FIG. 10 and FIG. 11.

The lens system composed of the first through fourth lens units has a total focal length $f_{14}$ which is given by the following formula (ix):

$$f_{14} = f/\beta_5 \qquad \text{(ix)}$$

That is to say, when $\beta_5$ is larger than 1, back focal length $Bf_{14}$ of the lens system composed of the first through fourth lens units is in the following relationship with back focal length $Bf$ of the zoom lens system as a whole:

$$Bf_{14} > Bf \qquad \text{(x)}$$

This relationship poses a requirement that the back focal length $Bf_{14}$ must be selected so as to maintain the required level of $\beta_5$ for arranging the fifth lens unit in the zoom lens system, thereby inevitably making it desirable to select a composition for the zoom lens system in which the rear focal point of the fourth lens unit is located on the image side of the rear focal point of an ordinary zoom lens system composed of four lens units. This fact must be taken into consideration for designing a zoom lens system to be used with single lens reflex cameras.

Though the fifth lens unit has the function mainly to correct the image surface, it is possible to design this lens unit so as to have an additional role to delicately balance spherical aberration. Further, the fifth lens unit has a merit that it has low susceptibility to manufacturing errors of the lens elements arranged in the fifth lens unit itself.

Since the fifth lens unit has a magnification which is low but larger than 1x as described above in the zoom lens system according to the present invention, the lens system composed of the first through fourth lens units has the total focal length expressed by the formula (ix) and it is relatively easy to design the zoom lens system compact as a whole. Since it is allowed, when correction of all the types of aberrations is considered, to design the first through fourth lens unit so as to have no functions to correct curvature of field or leave the curvature of field undercorrected in these lens units, they can have functions for correcting the other types of aberrations sufficiently favorably without strengthening the refractive powers thereof. Accordingly, it is possible to obtain a zoom lens system which is designed compact as a whole and has favorable optical performance.

For the zoom lens system according to the present invention, it is desirable to define the lateral magnification of the fifth lens unit so as to satisfy the abovementioned condition (3). If the lower limit of the condition (3) is exceeded, there will be produced a disadvantage for making the zoom lens system compact as a whole. That is to say, a lateral magnification of the fifth lens unit lower than the lower limit of the condition (3) will be smaller than 1x, thereby deviating the refractive power distribution in the zoom lens system from the aim set by the present invention. If the upper limit of the condition (3) is exceeded, there will be produced an advantage for making the zoom lens system compact, but the aberrations remaining in the first through fourth lens units will be magnified by the longitudinal magnification of the fifth lens unit, thereby degrading optical performance of the zoom lens system.

Descriptions have been made above on the paraxial refractive power distribution as well as the zooming system to be selected for compact design of the zoom lens system according to the present invention and favorable correction of aberrations in said zoom lens system. The zoom lens system according to the present invention is characterized, as described above, in that it is focused by moving at least one of the first lens unit through the fourth lens unit.

When the zoom lens system is designed compact, aggravation of aberrations poses a problem, thereby making important selection of focusing lens unit or lens units. Further, from the viewpoint not only of optical performance but also of manufacturing, it is necessary to control so as to prevent susceptibility of the image surface to movement of the lens unit or lens units, i.e., the longitudinal magnification of the focusing lens unit or lens units from being enhanced.

Focusing by moving the first lens unit is disadvantageous from the viewpoints of the outside diameter of the zoom lens system and variations of aberrations, but has a merit that moving distance for focusing remains substantially unchanged over the entire vari-focal range.

The inventor has sufficiently examined which lens units are to be selected as focusing lens units in the zoom lens system composed of the five lens units and found out the above-described focusing method on the basis of the examination results.

Now, focusing of the zoom lens system according to the present invention will be described detailedly below with reference to typical examples.

The zoom lens system according to the present invention is designed so as to satisfy the following condition (4) regarding the refractive power of the lens unit which is to be moved for focusing the zoom lens system (the total refractive power when a plurality of lens units are to be moved for focusing):

$$|\phi_{FW}| > \phi_1 \tag{4}$$

wherein the reference symbol $\phi_1$ represents the refractive power of the first lens unit and the reference symbol $\phi_{FW}$ designates the refractive power of the focusing lens unit or the total refractive power of the focusing lens units at the wide position.

The condition (4) defines that the refractive power of the focusing lens unit must be stronger than that of the first lens unit for making it possible to shorten the moving distance of the focusing lens unit and reduce variations of aberrations to be caused by focusing.

Now, examples of the focusing methods adopted for the zoom lens system according to the present invention will be described below.

There is available the rear focusing system which selects the third through fifth lens units as the focusing lens units and compensates for the deviation of the image surface by moving these lens units backward. When this focusing system is adopted for the zoom lens system according to the present invention, it is desirable to design the lens system composed of these three lens units so as to satisfy the following condition (5):

$$\phi_{345W} - \phi_{345T} < 0 \tag{5}$$

wherein the reference symbols $\phi_{345W}$ and $\phi_{345T}$ represent the refractive powers of the lens system composed of the third, fourth and fifth lens units at the wide position and the tele position respectively.

The condition (5) defines that the total refractive power of the third, fourth and fifth lens units at the tele position is stronger that at the wide position, thereby meaning that the moving distance of these lens units for focusing is short.

This focusing method is characterized in that the fifth lens unit which has the negative refractive power and makes no contribution to zooming is moved for focusing. The condition (5) is adopted since the focusing lens units are moved for zooming and the total refractive power thereof is varied by zooming.

As another focusing method, it is conceivable to move the second lens unit. When the second lens unit is moved by this method for focusing, two of the airspaces which have been varied by zooming are varied at the stage of the focusing so as to compensate for the variations of aberrations caused by the zooming. Though this method is not effective for compensating for all the types of aberrations, it is desirable since it is capable of fundamentally compensating for the variation of the paraxial refractive power distribution. When the second lens unit is selected as the focusing lens unit, there establishes the following formula (6):

$$\phi_{W2} = \phi_{T2} \tag{6}$$

wherein the reference symbols $\phi_{W2}$ and $\phi_{T2}$ represent the refractive powers of the second lens unit at the wide position and the tele position respectively.

However, this method allows the conjugate relationship between the object point and the image point to be varied by zooming, thereby allowing the moving distance for focusing to be varied within the vari-focal range from the wide position to the tele position.

Further, it is conceivable to move the first lens unit and the second lens unit integrally for focusing. This method scarecely allows variations of aberrations.

When this focusing method is applied to the zoom lens system according to the present invention, performance of the lens system is not degraded by designing it compact when the first lens unit and the second lens unit are designed so as to satisfy the following condition (7):

$$|\phi_{W12}| - |\phi_{T12}| > 0$$

wherein the reference symbols $\phi W12$ and $\phi T12$ represent the total refractive powers of the first lens unit and the second lens unit at the wide position and the tele position respectively.

The above-mentioned condition (7) means that the distance between the principal points of the fist lens unit and the second lens unit is prolonged from the wide position to the tele position, and that the zoom lens system is designed as the telephoto type.

When the first lens unit and the second lens unit are selected as the focusing lens units, these lens units are not apart far from the aperture stop, thereby making it possible to reduce the diameter of the first lens unit.

When the first lens unit and the second lens unit are selected as the focusing lens units, the total refractive power of these lens units is expressed by the following formula (xi):

$$\left. \begin{array}{l} \phi_{FW} = \phi_1 + \phi_2 - e_W' \cdot \phi_1 \cdot \phi_2 \\ \phi_{FT} = \phi_1 + \phi_2 - e_T' \cdot \phi_1 \cdot \phi_2 \\ \Delta e' = e_T' - e_W' \end{array} \right\} \quad (xi)$$

wherein the reference symbols $\phi_{FW}$ and $\phi_{FT}$ represent the total refractive powers of the focusing lens units at the wide position and the tele position respectively, and the reference symbols $e_W'$ and $e_T'$ designate the distance between the principal points of the first lens unit and the second lens unit at the wide position and tele position respectively.

Since the moving distance for focusing varies dependently on the focal length of the zoom lens system as a whole as is seen from the formula (xi), it is necessary to take consideration so as not to allow an extremely large difference $\Delta e'$, between the wide position and the tele position, in the distance as measured from the principal point of the first lens unit to that of the second lens unit. Influence on the image surface due to focusing is given as $\gamma$ expressed by the following formula (xii), and can be judged from the condition (1) and the formula (xi):

$$\gamma = (\beta_3 \cdot \beta_4 \cdot \beta_5)^2 \quad (xii)$$

That is to say, it is important to pay attention to value of $\gamma$ expressed by the above-mentioned formula (xii) in selecting one of the focusing methods.

Even when the so-called inner focusing system or the rear focusing system is selected, the imaging relationship of the focusing lens unit is varied by varying focal length, whereby the moving distance for focusing is varied dependently on the focal length of the zoom lens system. Accordingly, it is necessary to take into sufficient consideration the susceptibility of the image surface to the movement of the focusing unit.

The focusing methods described above adopted for the zoom lens system according to the present invention will be described concretely with reference to the Embodiment 1 which is to be explained later.

FIG. 41, FIG. 42 and FIG. 43 show curves illustrating aberration characteristics at the wide position, intermediate focal length and tele position of the zoom lens system preferred as the Embodiment 1 when the third, fourth and fifth lens units are selected as the focusing lens units, and the zoom lens system is focused on an object located at a distance of 1.5 m. As is seen from these drawings, the meridional image surface is a little undercorrected but is corrected favorably for practical use. This focusing method is the so-called rear focusing method and has a characteristic that it does not vary the total length of the zoom lens system.

When the seocnd lens unit is selected as the focusing lens unit in the Embodiment 1 and the zoom lens system is focused on the object located at the distance of 1.5 m, aberration characteristics at the wide position, intermediate focal length and tele position are as illustrated in FIG. 44, FIG. 45 and FIG. 46 respectively. When this focusing method is selected, spherical aberration is varied little at the tele position, the image surface is shifted always in the same direction by focusing and aberrations are corrected sufficiently for practical use though astigmatism is a little undercorrected. This focusing method is the so-called inner focus type.

When the front lens units, i.e., the first lens unit and the second lens unit, are selected as the focusing lens units in the Embodiment 1 and the zoom lens system is focused on the object located at the distance of 1.5 m, aberration characteristics at the wide position, intermediate focal length and tele position are as visualized in FIG. 47, FIG. 48 and FIG. 49 respectively. This focusing method allows little variation of aberrations at any focal length and assures very favorably performance for the zoom lens system.

For focusing the zoom lens system by the methods described above, the focusing lens units are moved for the distances listed in the following table:

|  | W | S | (mm) T |
| --- | --- | --- | --- |
| 3rd ~ 5th lens units | −1.17 | −1.35 | −2.61 |
| 2nd lens unit | 0.57 | 1.20 | 3.48 |
| 1st · 2nd lens units | 0.51 | 0.95 | 2.11 |

In the above table, the distances preceded by the negative sign indicate movements of the focusing lens units toward the image side.

In addition to the fundamental examples of focusing methods for the zoom lens system according to the present invention, it is possible to conceive various modifications of the focusing methods. The present invention has an object to provide a compact zoom lens system having favorable imaging performance, and adopts the focusing methods, other than the method using the first lens unit as the focusing lens unit, which require short moving distances for focusing and allow little variation of aberrations.

The fifth lens unit is not moved for varying focal length and has a magnification which is substantially unchanged from the wide position to the tele position. Further, the magnification $\beta_5$ of the fifth lens unit which is larger than 1x for the image formed by the first through fourth lens units should desirably within the range defined by the following condition:

$$1<\beta_5<1.3$$

If the lower limit of this condition is exceeded, the zoom lens system will have a refractive power distribution deviated from that specified by the present invention. If the upper limit of this condition is exceeded, the fifth lens unit will have a stronger refractive power, thereby making it necessary to increase the number of lens elements for composing the zoom lens system for in order to maintain favorable optical performance of the zoom lens system and modify the compositions of the lens units consisting of thick lens elements.

BRIEF DESCRIPTION OF THE DRAWINGS

FIG. 44, FIG. 45 and FIG. 46 show curves illustrating aberration characteristics of the Embodiment 1 of the present invention when it is focused on an object located at a distance of 1.5 m by moving the second lens unit;

DETAILED DESCRIPTION OF THE PREFERRED EMBODIMENTS

Figure 1:
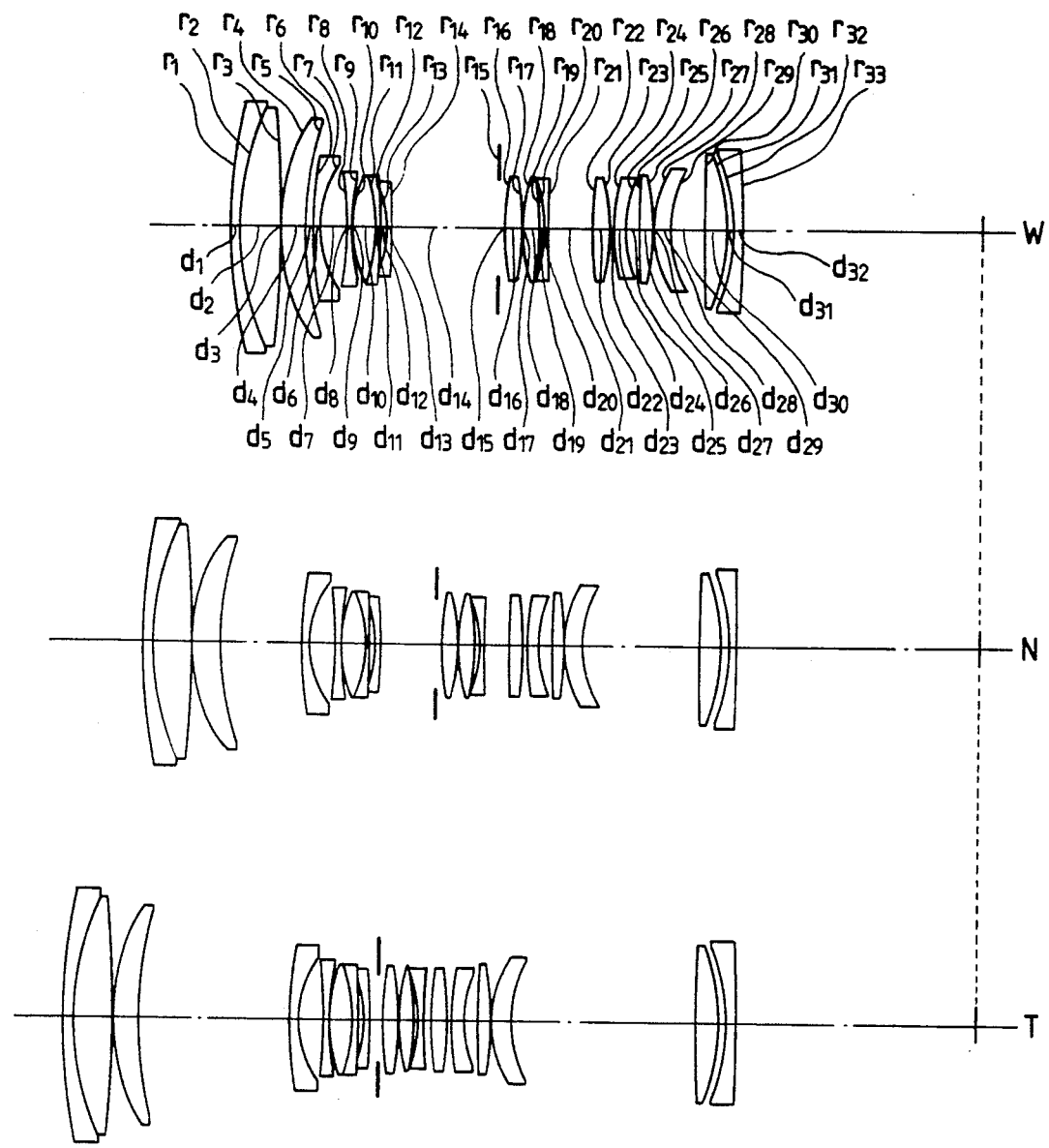
FIG. 1 through FIG. 8 show sectional views illustrating compositions of Embodiments 1 through 8 of the zoom lens system according to the present invention.
Figure 2:
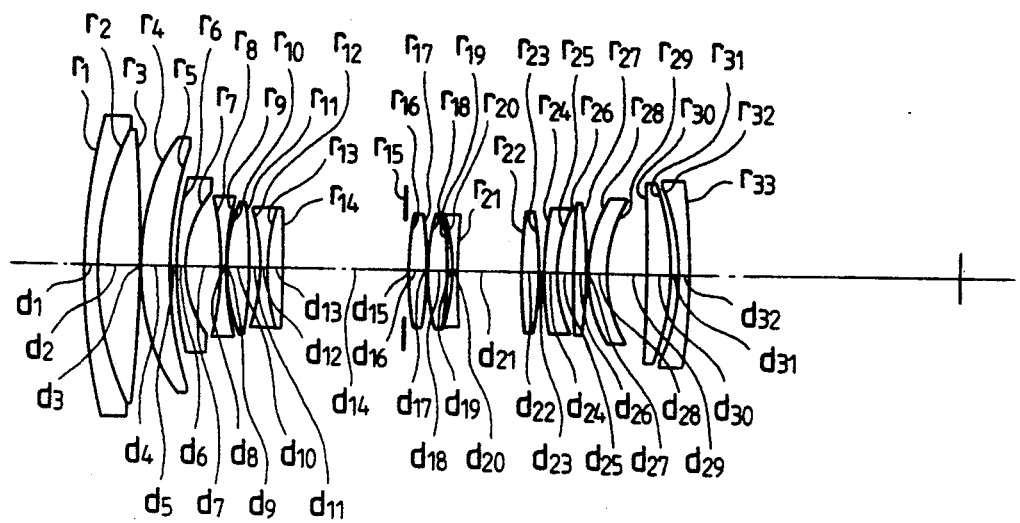
Figure 3:
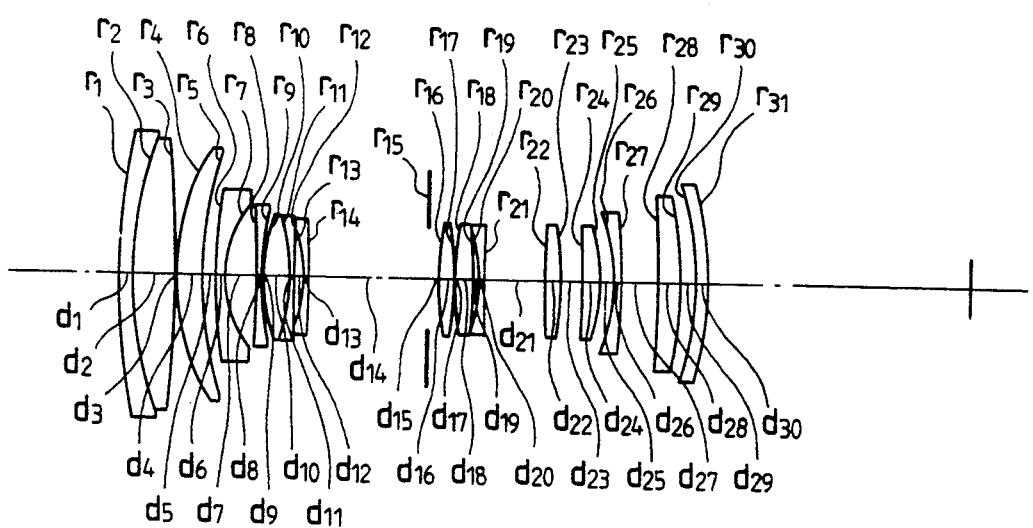
Figure 4:
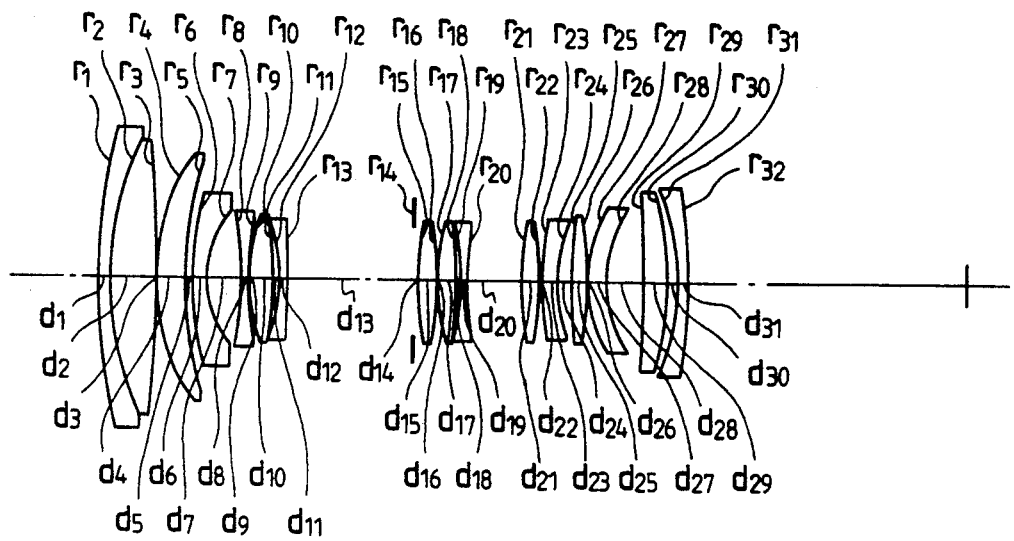
Figure 5:
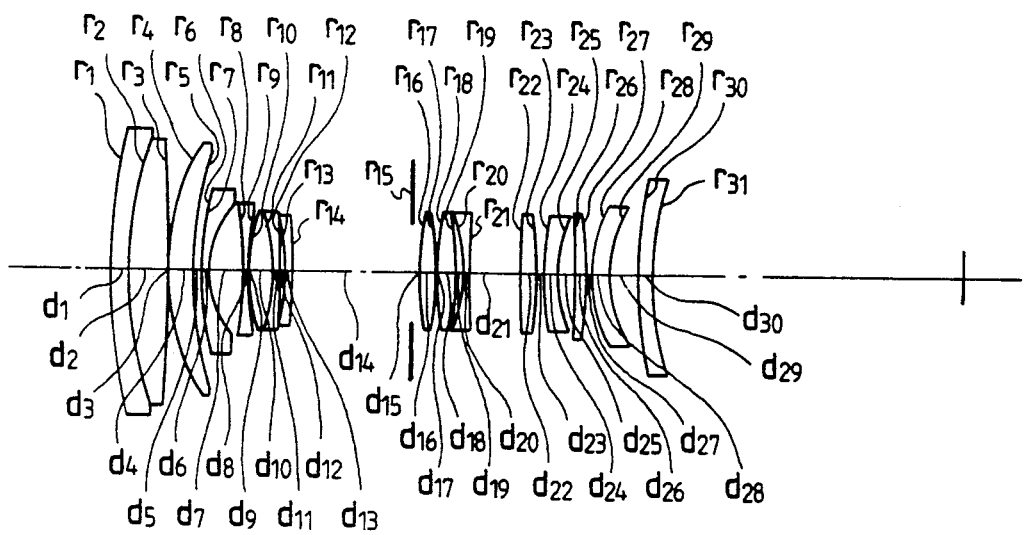
Figure 6:
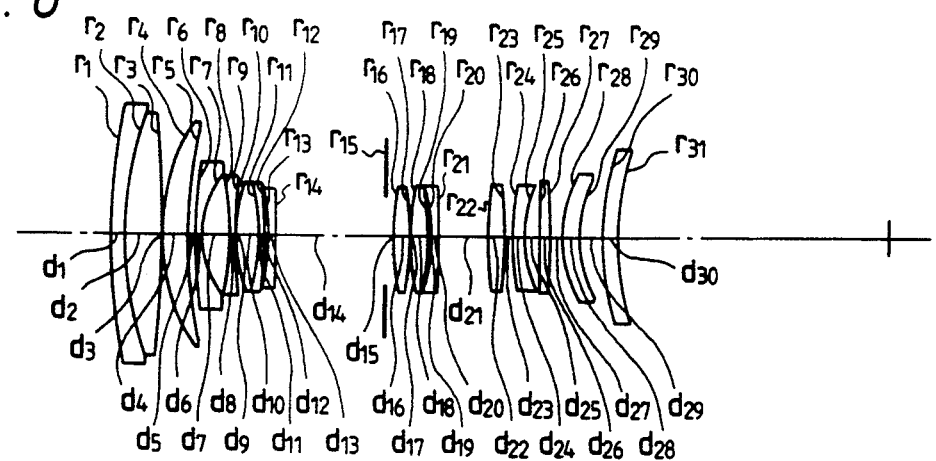
Figure 7:
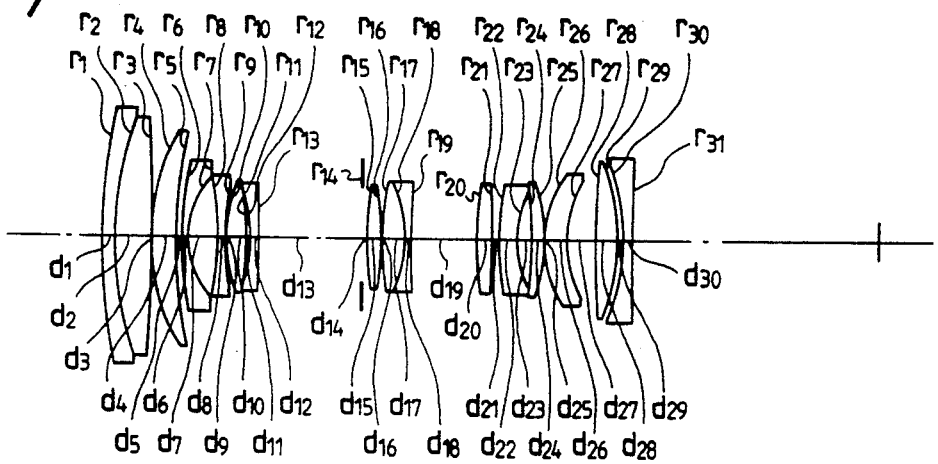

Now, the present invention will be described more detailedly below with reference to the preferred embodiments illustrated in the accompanying drawings and given in the form of the following numerical data:

| Embodiment 1 $f = 36.13 \sim 131.5$ F/4.6~5.83 $2\omega = 61.8° \sim 18.6°$ | | |
|---|---|---|
| $r_1 = 95.7459$ | | |
| $d_1 = 1.9400$ | $n_1 = 1.80518$ | $\nu_1 = 25.43$ |
| $r_2 = 50.5189$ | | |
| $d_2 = 5.6000$ | $n_2 = 1.60311$ | $\nu_2 = 60.70$ |
| $r_3 = -274.7830$ | | |
| $d_3 = 0.1500$ | | |
| $r_4 = 31.1140$ | | |
| $d_4 = 4.3000$ | $n_3 = 1.49700$ | $\nu_3 = 81.61$ |
| $r_5 = 56.1103$ | | |
| $d_5 = D_1$ (variable) | | |
| $r_6 = 78.2872$ | | |
| $d_6 = 1.1000$ | $n_4 = 1.83400$ | $\nu_4 = 37.16$ |
| $r_7 = 15.5792$ | | |
| $d_7 = 4.0968$ | | |
| $r_8 = -96.8212$ | | |
| $d_8 = 0.9000$ | $n_5 = 1.80610$ | $\nu_5 = 40.95$ |
| $r_9 = 42.1872$ | | |
| $d_9 = 0.1500$ | | |
| $r_{10} = 26.0033$ | | |
| $d_{10} = 3.7500$ | $n_6 = 1.84666$ | $\nu_6 = 23.78$ |
| $r_{11} = -26.7562$ | | |
| $d_{11} = 0.8000$ | $n_7 = 1.77250$ | $\nu_7 = 49.66$ |
| $r_{12} = -223.3242$ | | |
| $d_{12} = 0.9180$ | | |
| $r_{13} = -27.1344$ | | |
| $d_{13} = 0.8500$ | $n_8 = 1.83400$ | $\nu_8 = 37.16$ |
| $r_{14} = -135.1278$ | | |
| $d_{14} = D_2$ (variable) | | |
| $r_{15} = \infty$ (stop) | | |
| $d_{15} = 1.1500$ | | |
| $r_{16} = 49.3507$ | | |
| $d_{16} = 2.3800$ | $n_9 = 1.67790$ | $\nu_9 = 55.33$ |
| $r_{17} = -58.3785$ | | |
| $d_{17} = 0.1500$ | | |

-continued

Embodiment 1
$f = 36.13 \sim 131.5 \ F/4.6 \sim 5.83$
$2\omega = 61.8° \sim 18.6°$

| | | | |
|---|---|---|---|
| $r_{18} = 27.0622$ | | | |
| $d_{18} = 2.4800$ | $n_{10} = 1.48749$ | $\nu_{10} = 70.20$ | |
| $r_{19} = -224.2899$ | | | |
| $d_{19} = 0.5237$ | | | |
| $r_{20} = -42.6516$ | | | |
| $d_{20} = 1.2100$ | $n_{11} = 1.80518$ | $\nu_{11} = 25.43$ | |
| $r_{21} = 229.2310$ | | | |
| $d_{21} = D_3$ (variable) | | | |
| $r_{22} = 68.7773$ | | | |
| $d_{22} = 2.4600$ | $n_{12} = 1.74000$ | $\nu_{12} = 28.29$ | |
| $r_{23} = -80.3757$ | | | |
| $d_{23} = 0.5500$ | | | |
| $r_{24} = 46.9485$ | | | |
| $d_{24} = 2.0000$ | $n_{13} = 1.80518$ | $\nu_{13} = 25.43$ | |
| $r_{25} = 18.6656$ | | | |
| $d_{25} = 2.1000$ | | | |
| $r_{26} = 82.2991$ | | | |
| $d_{26} = 2.3200$ | $n_{14} = 1.48749$ | $\nu_{14} = 70.20$ | |
| $r_{27} = -54.9843$ | | | |
| $d_{27} = 0.1500$ | | | |
| $r_{28} = 17.5907$ | | | |
| $d_{28} = 2.6400$ | $n_{15} = 1.57501$ | $\nu_{15} = 41.49$ | |
| $r_{29} = 18.9925$ | | | |
| $d_{29} = D_4$ (variable) | | | |
| $r_{30} = 249.1056$ | | | |
| $d_{30} = 3.7500$ | $n_{16} = 1.61293$ | $\nu_{16} = 37.00$ | |
| $r_{31} = -32.6587$ | | | |
| $d_{31} = 1.1500$ | | | |
| $r_{32} = -29.6744$ | | | |
| $d_{32} = 1.4300$ | $n_{17} = 1.83400$ | $\nu_{17} = 37.16$ | |
| $r_{33} = -223.2953$ | | | |

| | W | S | T |
|---|---|---|---|
| f | 36.13 | 68.93 | 131.5 |
| $D_1$ | 1.200 | 13.445 | 24.445 |
| $D_2$ | 17.500 | 8.899 | 1.200 |
| $D_3$ | 7.500 | 3.744 | 1.285 |
| $D_4$ | 5.450 | 18.921 | 30.600 |

$|f_2/f_1| = 0.235 \quad |\beta_{3W} \cdot \beta_{4W}| = 1.22584$
$\beta_5 = 1.0709$

Embodiment 2
$f = 36.13 \sim 131.5 \ F/4.6 \sim 5.8$
$2\omega = 61.8° \sim 18.6°$

| | | | |
|---|---|---|---|
| $r_1 = 84.2365$ | | | |
| $d_1 = 1.9400$ | $n_1 = 1.80518$ | $\nu_1 = 25.43$ | |
| $r_2 = 47.0030$ | | | |
| $d_2 = 5.6000$ | $n_2 = 1.60311$ | $\nu_2 = 60.70$ | |
| $r_3 = -454.5803$ | | | |
| $d_3 = 0.1500$ | | | |
| $r_4 = 30.5231$ | | | |
| $d_4 = 4.3000$ | $n_3 = 1.49700$ | $\nu_3 = 81.61$ | |
| $r_5 = 54.2094$ | | | |
| $d_5 = D_1$ (variable) | | | |
| $r_6 = 60.3730$ | | | |
| $d_6 = 1.1000$ | $n_4 = 1.83400$ | $\nu_4 = 37.16$ | |
| $r_7 = 15.8032$ | | | |
| $d_7 = 4.6500$ | | | |
| $r_8 = -70.4976$ | | | |
| $d_8 = 0.9500$ | $n_5 = 1.76200$ | $\nu_5 = 40.10$ | |
| $r_9 = 45.7727$ | | | |
| $d_9 = 0.1300$ | | | |
| $r_{10} = 26.9711$ | | | |
| $d_{10} = 2.9000$ | $n_6 = 1.84666$ | $\nu_6 = 23.88$ | |
| $r_{11} = -102.1689$ | | | |
| $d_{11} = 1.6820$ | | | |
| $r_{12} = -31.2134$ | | | |
| $d_{12} = 0.9500$ | $n_7 = 1.83481$ | $\nu_7 = 42.72$ | |
| $r_{13} = 26.8934$ | | | |
| $d_{13} = 2.1000$ | $n_8 = 1.80518$ | $\nu_8 = 25.43$ | |
| $r_{14} = 556.1993$ | | | |
| $d_{14} = D_2$ (variable) | | | |
| $r_{15} = \infty$ (stop) | | | |
| $d_{15} = 1.1000$ | | | |
| $r_{16} = 58.6648$ | | | |
| $d_{16} = 2.3800$ | $n_9 = 1.74320$ | $\nu_9 = 49.31$ | |

-continued

Embodiment 2
$f = 36.13 \sim 131.5 \ F/4.6 \sim 5.8$
$2\omega = 61.8° \sim 18.6°$

| | | | |
|---|---|---|---|
| $r_{17} = -62.5010$ | | | |
| $d_{17} = 0.1500$ | | | |
| $r_{18} = 26.2428$ | | | |
| $d_{18} = 2.4800$ | $n_{10} = 1.48749$ | $\nu_{10} = 70.20$ | |
| $r_{19} = -690.2536$ | | | |
| $d_{19} = 0.5450$ | | | |
| $r_{20} = -53.1483$ | | | |
| $d_{20} = 1.2100$ | $n_{11} = 1.80518$ | $\nu_{11} = 25.43$ | |
| $r_{21} = 145.6139$ | | | |
| $d_{21} = D_3$ (variable) | | | |
| $r_{22} = 73.8675$ | | | |
| $d_{22} = 2.4600$ | $n_{12} = 1.58921$ | $\nu_{12} = 41.08$ | |
| $r_{23} = -71.9810$ | | | |
| $d_{23} = 0.5500$ | | | |
| $r_{24} = 38.0904$ | | | |
| $d_{24} = 2.0000$ | $n_{13} = 1.80518$ | $\nu_{13} = 25.43$ | |
| $r_{25} = 19.1097$ | | | |
| $d_{25} = 2.1000$ | | | |
| $r_{26} = 69.7929$ | | | |
| $d_{26} = 2.3200$ | $n_{14} = 1.48749$ | $\nu_{14} = 70.20$ | |
| $r_{27} = -72.5331$ | | | |
| $d_{27} = 0.1500$ | | | |
| $r_{28} = 17.6935$ | | | |
| $d_{28} = 2.6400$ | $n_{15} = 1.75520$ | $\nu_{15} = 27.51$ | |
| $r_{29} = 18.2941$ | | | |
| $d_{29} = D_4$ (variable) | | | |
| $r_{30} = -1203.3030$ | | | |
| $d_{30} = 3.7500$ | $n_{16} = 1.56637$ | $\nu_{16} = 42.91$ | |
| $r_{31} = -33.3279$ | | | |
| $d_{31} = 1.1500$ | | | |
| $r_{32} = -28.6517$ | | | |
| $d_{32} = 1.4300$ | $n_{17} = 1.80610$ | $\nu_{17} = 40.95$ | |
| $r_{33} = -93.0031$ | | | |

| | W | S | T |
|---|---|---|---|
| f | 36.13 | 68.93 | 131.5 |
| $D_1$ | 0.900 | 12.948 | 23.897 |
| $D_2$ | 17.500 | 8.784 | 1.200 |
| $D_3$ | 9.448 | 4.547 | 0.700 |
| $D_4$ | 5.798 | 19.354 | 30.600 |

$|f_2/f_1| = 0.231 \quad |\beta_{3W} \cdot \beta_{4W}| = 1.2450$
$\beta_5 = 1.0861$

Embodiment 3
$f = 36.1 \sim 131.36 \ F/4.6 \sim 5.89$
$2\omega = 61.8° \sim 18.6°$

| | | | |
|---|---|---|---|
| $r_1 = 87.4945$ | | | |
| $d_1 = 1.9400$ | $n_1 = 1.80518$ | $\nu_1 = 25.43$ | |
| $r_2 = 50.6883$ | | | |
| $d_2 = 5.6000$ | $n_2 = 1.60300$ | $\nu_2 = 65.48$ | |
| $r_3 = -250.1643$ | | | |
| $d_3 = 0.1500$ | | | |
| $r_4 = 31.7923$ | | | |
| $d_4 = 3.9000$ | $n_3 = 1.45650$ | $\nu_3 = 90.77$ | |
| $r_5 = 55.9558$ | | | |
| $d_5 = D_1$ (variable) | | | |
| $r_6 = 95.7177$ | | | |
| $d_6 = 1.1000$ | $n_4 = 1.83400$ | $\nu_4 = 37.16$ | |
| $r_7 = 16.1708$ | | | |
| $d_7 = 4.2420$ | | | |
| $r_8 = -163.1137$ | | | |
| $d_8 = 0.9100$ | $n_5 = 1.80610$ | $\nu_5 = 40.95$ | |
| $r_9 = 44.2051$ | | | |
| $d_9 = 0.1500$ | | | |
| $r_{10} = 25.5672$ | | | |
| $d_{10} = 3.6500$ | $n_6 = 1.84666$ | $\nu_6 = 23.78$ | |
| $r_{11} = -27.1032$ | | | |
| $d_{11} = 0.8500$ | $n_7 = 1.77250$ | $\nu_7 = 49.66$ | |
| $r_{12} = \infty$ | | | |
| $d_{12} = 0.9330$ | | | |
| $r_{13} = -27.5721$ | | | |
| $d_{13} = 0.8500$ | $n_8 = 1.83400$ | $\nu_8 = 37.16$ | |
| $r_{14} = -214.7555$ | | | |
| $d_{14} = D_2$ (variable) | | | |
| $r_{15} = \infty$ (stop) | | | |
| $d_{15} = 1.1000$ | | | |

-continued

Embodiment 3
$f = 36.1 \sim 131.36$ F/4.6~5.89
$2\omega = 61.8° \sim 18.6°$

| | | |
|---|---|---|
| $r_{16} = 33.5325$ | | |
| $d_{16} = 2.3800$ | $n_9 = 1.65160$ | $v_9 = 58.52$ |
| $r_{17} = -59.2365$ | | |
| $d_{17} = 0.1500$ | | |
| $r_{18} = 37.1593$ | | |
| $d_{18} = 2.4800$ | $n_{10} = 1.48749$ | $v_{10} = 70.20$ |
| $r_{19} = -505.7675$ | | |
| $d_{19} = 0.5450$ | | |
| $r_{20} = -35.5239$ | | |
| $d_{20} = 1.2100$ | $n_{11} = 1.80518$ | $v_{11} = 25.43$ |
| $r_{21} = -2596.5798$ | | |
| $d_{21} = D_3$ (variable) | | |
| $r_{22} = 170.5873$ | | |
| $d_{22} = 2.3600$ | $n_{12} = 1.58313$ | $v_{12} = 59.36$ |
| $r_{23} = -38.3502$ | | |
| $d_{23} = 3.1680$ | | |
| $r_{24} = -120.1658$ | | |
| $d_{24} = 2.4700$ | $n_{13} = 1.69680$ | $v_{13} = 55.52$ |
| $r_{25} = -29.3170$ | | |
| $d_{25} = 2.1860$ | | |
| $r_{26} = -24.7435$ | | |
| $d_{26} = 1.0000$ | $n_{14} = 1.83400$ | $v_{14} = 37.16$ |
| $r_{27} = -68.7241$ (aspherical surface) | | |
| $d_{27} = D_4$ (variable) | | |
| $r_{28} = -106.5424$ | | |
| $d_{28} = 3.2000$ | $n_{15} = 1.62374$ | $v_{15} = 47.10$ |
| $r_{29} = -60.8491$ | | |
| $d_{29} = 2.2840$ | | |
| $r_{30} = -36.1664$ | | |
| $d_{30} = 1.4300$ | $n_{16} = 1.63854$ | $v_{16} = 55.38$ |
| $r_{31} = -60.5999$ | | | aspherical surface coefficient
$E = 0.12548 \times 10^{-4}$   $F = 0.48371 \times 10^{-8}$
$G = 0.28292 \times 10^{-9}$   $H = -0.15268 \times 10^{-11}$

| | W | S | T |
|---|---|---|---|
| f | 36.11 | 68.87 | 131.36 |
| $D_1$ | 1.950 | 13.281 | 25.438 |
| $D_2$ | 17.500 | 8.756 | 1.274 |
| $D_3$ | 8.659 | 6.079 | 4.713 |
| $D_4$ | 5.400 | 19.190 | 27.917 |

$|f_2/f_1| = 0.2306$   $|\beta_{3W} \cdot \beta_{4W}| = 1.2234$
$\beta_5 = 1.106$

Embodiment 4
$f = 36.11 \sim 131.36$ F/4.6~5.82
$2\omega = 61.8° \sim 18.6°$

| | | |
|---|---|---|
| $d_{15} = 2.3800$ | $n_8 = 1.61700$ | $v_8 = 62.79$ |
| $r_{16} = -56.9491$ | | |
| $d_{16} = 0.1500$ | | |
| $r_{17} = 28.2124$ | | |
| $d_{17} = 2.4800$ | $n_9 = 1.61700$ | $v_9 = 62.79$ |
| $r_{18} = -118.4463$ | | |
| $d_{18} = 0.5450$ | | |
| $r_{19} = -42.1894$ | | |
| $d_{19} = 1.2100$ | $n_{10} = 1.83400$ | $v_{10} = 37.16$ |
| $r_{20} = 69.7710$ | | |
| $d_{20} = D_3$ (variable) | | |
| $r_{21} = 40.3856$ | | |
| $d_{21} = 2.4600$ | $n_{11} = 1.61700$ | $v_{11} = 62.79$ |
| $r_{22} = -57.9615$ | | |
| $d_{22} = 0.5500$ | | |
| $r_{23} = 52.8138$ | | |
| $d_{23} = 2.0000$ | $n_{12} = 1.83400$ | $v_{12} = 37.16$ |
| $r_{24} = 17.1475$ | | |
| $d_{24} = 2.1000$ | | |
| $r_{25} = 52.5630$ | | |
| $d_{25} = 2.3200$ | $n_{13} = 1.48749$ | $v_{13} = 70.20$ |
| $r_{26} = -67.5941$ | | |
| $d_{26} = 0.1500$ | | |
| $r_{27} = 16.7733$ | | |
| $d_{27} = 2.6400$ | $n_{14} = 1.54072$ | $v_{14} = 47.20$ |
| $r_{28} = 18.3352$ | | |
| $d_{28} = D_4$ (variable) | | |
| $r_{29} = -229.7820$ | | |
| $d_{29} = 3.7500$ | $n_{15} = 1.57309$ | $v_{15} = 42.57$ |
| $r_{30} = -37.6621$ | | |
| $d_{30} = 1.1500$ | | |
| $r_{31} = -30.9908$ | | |
| $d_{31} = 1.4300$ | $n_{16} = 1.72000$ | $v_{16} = 50.25$ |
| $r_{32} = -93.2935$ | | |

| | W | S | T |
|---|---|---|---|
| f | 36.11 | 68.87 | 131.36 |
| $D_1$ | 1.200 | 12.745 | 23.560 |
| $D_2$ | 17.500 | 8.729 | 1.200 |
| $D_3$ | 7.838 | 4.011 | 1.227 |
| $D_4$ | 5.450 | 18.906 | 30.600 |

$|f_2/f_1| = 0.2333$   $|\beta_{3W} \cdot \beta_{4W}| = 1.21908$
$\beta_5 = 1.09644$

Embodiment 4
$f = 36.11 \sim 131.36$ F/4.6~5.82
$2\omega = 61.8° \sim 18.6°$

| | | |
|---|---|---|
| $r_1 = 82.1099$ | | |
| $d_1 = 1.9400$ | $n_1 = 1.80518$ | $v_1 = 25.43$ |
| $r_2 = 45.2209$ | | |
| $d_2 = 6.0500$ | $n_2 = 1.60311$ | $v_2 = 60.70$ |
| $r_3 = -484.4801$ | | |
| $d_3 = 0.1500$ | | |
| $r_4 = 30.614$ | | |
| $d_4 = 4.3000$ | $n_3 = 1.48749$ | $v_3 = 70.20$ |
| $r_5 = 53.6819$ | | |
| $d_5 = D_1$ (variable) | | |
| $r_6 = 59.5305$ | | |
| $d_6 = 1.3800$ | $n_4 = 1.74100$ | $v_4 = 52.68$ |
| $r_7 = 14.2484$ | | |
| $d_7 = 4.9000$ | | |
| $r_8 = -46.4387$ | | |
| $d_8 = 1.1000$ | $n_5 = 1.83481$ | $v_5 = 42.72$ |
| $r_9 = 41.6882$ | | |
| $d_9 = 0.1500$ | | |
| $r_{10} = 27.8246$ | | |
| $d_{10} = 3.2000$ | $n_6 = 1.84666$ | $v_6 = 23.88$ |
| $r_{11} = -53.1174$ | | |
| $d_{11} = 0.8850$ | | |
| $r_{12} = -27.0541$ | | |
| $d_{12} = 1.2000$ | $n_7 = 1.81554$ | $v_7 = 44.36$ |
| $r_{13} = -181.3070$ | | |
| $d_{13} = D_2$ (variable) | | |
| $r_{14} = \infty$ (stop) | | |
| $d_{14} = 1.1550$ | | |
| $r_{15} = 43.2454$ | | |

Embodiment 5
$f = 36.16 \sim 131.50$ F/4.6~5.8
$2\omega = 61.8° \sim 18.6°$

| | | |
|---|---|---|
| $r_1 = 98.3830$ | | |
| $d_1 = 1.9400$ | $n_1 = 1.80518$ | $v_1 = 25.43$ |
| $r_2 = 49.0551$ | | |
| $d_2 = 5.6000$ | $n_2 = 1.62041$ | $v_2 = 60.27$ |
| $r_3 = -671.5974$ | | |
| $d_3 = 0.1500$ | | |
| $r_4 = 31.1004$ | | |
| $d_4 = 4.0000$ | $n_3 = 1.49700$ | $v_3 = 81.61$ |
| $r_5 = 67.9099$ | | |
| $d_5 = D_1$ (variable) | | |
| $r_6 = 56.0097$ | | |
| $d_6 = 1.0500$ | $n_4 = 1.81554$ | $v_4 = 44.36$ |
| $r_7 = 14.9031$ | | |
| $d_7 = 4.3500$ | | |
| $r_8 = -78.0215$ | | |
| $d_8 = 0.8500$ | $n_5 = 1.79500$ | $v_5 = 45.29$ |
| $r_9 = 47.3279$ | | |
| $d_9 = 0.1000$ | | |
| $r_{10} = 26.0530$ | | |
| $d_{10} = 3.5000$ | $n_6 = 1.84666$ | $v_6 = 23.78$ |
| $r_{11} = -30.2545$ | | |
| $d_{11} = 0.8100$ | $n_7 = 1.77250$ | $v_7 = 49.66$ |
| $r_{12} = -758.2806$ | | |
| $d_{12} = 0.9561$ | | |
| $r_{13} = -28.0121$ | | |
| $d_{13} = 0.8500$ | $n_8 = 1.85030$ | $v_8 = 32.18$ |
| $r_{14} = -146.5327$ | | |
| $d_{14} = D_2$ (variable) | | |
| $r_{15} = \infty$ (stop) | | |

-continued

Embodiment 5
f = 36.16~131.50 F/4.6~5.8
2ω = 61.8°~18.6°

| | | |
|---|---|---|
| $d_{15} = 1.1000$ | | |
| $r_{16} = 46.8087$ | | |
| $d_{16} = 2.3800$ | $n_9 = 1.60300$ | $v_9 = 65.48$ |
| $r_{17} = -44.7515$ | | |
| $d_{17} = 0.1500$ | | |
| $r_{18} = 31.9221$ | | |
| $d_{18} = 2.4800$ | $n_{10} = 1.50378$ | $v_{10} = 66.81$ |
| $r_{19} = -481.5668$ | | |
| $d_{19} = 0.5450$ | | |
| $r_{20} = -36.9379$ | | |
| $d_{20} = 1.2100$ | $n_{11} = 1.80518$ | $v_{11} = 25.43$ |
| $r_{21} = -4984.2983$ | | |
| $d_{21} = D_3$ (variable) | | |
| $r_{22} = 99.6608$ | | |
| $d_{22} = 2.4600$ | $n_{12} = 1.74000$ | $v_{12} = 28.29$ |
| $r_{23} = -67.4904$ | | |
| $d_{23} = 1.0000$ | | |
| $r_{24} = 34.7772$ | | |
| $d_{24} = 2.0000$ | $n_{13} = 1.80518$ | $v_{13} = 25.43$ |
| $r_{25} = 18.7778$ | | |
| $d_{25} = 2.3532$ | | |
| $r_{26} = 159.3260$ | | |
| $d_{26} = 2.3200$ | $n_{14} = 1.49700$ | $v_{14} = 81.61$ |
| $r_{27} = -50.0169$ | | |
| $d_{27} = 0.5000$ | | |
| $r_{28} = 17.9495$ | | |
| $d_{28} = 2.6400$ | $n_{15} = 1.48749$ | $v_{15} = 70.20$ |
| $r_{29} = 19.7258$ | | |
| $d_{29} = D_4$ (variable) | | |
| $r_{30} = 54.4622$ | | |
| $d_{30} = 2.2000$ | $n_{16} = 1.49216$ | $v_{16} = 57.50$ |
| $r_{31} = 42.3593$ (aspherical surface) | | | aspherical surface coefficient
$E = 0.32055 \times 10^{-5}$   $F = -0.24374 \times 10^{-7}$
$G = 0.10186 \times 10^{-9}$   $H = -0.14394 \times 10^{-12}$

| | W | S | T |
|---|---|---|---|
| f | 36.16 | 68.96 | 131.5 |
| $D_1$ | 0.950 | 13.844 | 23.550 |
| $D_2$ | 16.922 | 8.551 | 0.740 |
| $D_3$ | 7.500 | 3.791 | 1.612 |
| $D_4$ | 3.880 | 15.800 | 29.780 |

$|f_2/f_1| = 0.237$   $|\beta_{3W} \cdot \beta_{4W}| = 1.24209$
$\beta_5 = 1.093$

Embodiment 6
f = 36.17~131.51 F/4.6~5.8
2ω = 61.8°~18.6°

| | | |
|---|---|---|
| $r_1 = 105.9429$ | | |
| $d_1 = 1.9400$ | $n_1 = 1.80518$ | $v_1 = 25.43$ |
| $r_2 = 51.8440$ | | |
| $d_2 = 5.6000$ | $n_2 = 1.60311$ | $v_2 = 60.70$ |
| $r_3 = -316.7682$ | | |
| $d_3 = 0.1500$ | | |
| $r_4 = 31.4876$ | | |
| $d_4 = 4.0000$ | $n_3 = 1.49700$ | $v_3 = 81.61$ |
| $r_5 = 69.0005$ | | |
| $d_5 = D_1$ (variable) | | |
| $r_6 = 58.1533$ | | |
| $d_6 = 1.0500$ | $n_4 = 1.78590$ | $v_4 = 44.18$ |
| $r_7 = 14.7526$ | | |
| $d_7 = 4.3500$ | | |
| $r_8 = -47.3835$ | | |
| $d_8 = 0.8500$ | $n_5 = 1.77250$ | $v_5 = 49.66$ |
| $r_9 = 75.9347$ | | |
| $d_9 = 0.1000$ | | |
| $r_{10} = 28.2357$ | | |
| $d_{10} = 3.5000$ | $n_6 = 1.84666$ | $v_6 = 23.78$ |
| $r_{11} = -29.9043$ | | |
| $d_{11} = 0.8100$ | $n_7 = 1.77250$ | $v_7 = 49.66$ |
| $r_{12} = -150.6929$ | | |
| $d_{12} = 0.7692$ | | |
| $r_{13} = -29.6976$ | | |
| $d_{13} = 0.8500$ | $n_8 = 1.85030$ | $v_8 = 32.18$ |
| $r_{14} = -420.0608$ | | |
| $d_{14} = D_2$ (variable) | | |

Embodiment 6
f = 36.17~131.51 F/4.6~5.8
2ω = 61.8°~18.6°

| | | |
|---|---|---|
| $r_{15} = \infty$ (stop) | | |
| $d_{15} = 1.1000$ | | |
| $r_{16} = 41.5793$ | | |
| $d_{16} = 2.3800$ | $n_9 = 1.60300$ | $v_9 = 65.48$ |
| $r_{17} = -47.0682$ | | |
| $d_{17} = 0.1500$ | | |
| $r_{18} = 35.8643$ | | |
| $d_{18} = 2.4800$ | $n_{10} = 1.50378$ | $v_{10} = 66.81$ |
| $r_{19} = -260.0258$ | | |
| $d_{19} = 0.5450$ | | |
| $r_{20} = -34.2587$ | | |
| $d_{20} = 1.2100$ | $n_{11} = 1.80518$ | $v_{11} = 25.43$ |
| $r_{21} = -409.2064$ | | |
| $d_{21} = D_3$ (variable) | | |
| $r_{22} = 72.5368$ | | |
| $d_{22} = 2.4600$ | $n_{12} = 1.74077$ | $v_{12} = 27.79$ |
| $r_{23} = -72.1309$ | | |
| $d_{23} = 1.1599$ | | |
| $r_{24} = 40.4038$ | | |
| $d_{24} = 2.0000$ | $n_{13} = 1.80518$ | $v_{13} = 25.43$ |
| $r_{25} = 18.5915$ | | |
| $d_{25} = 2.1000$ | | |
| $r_{26} = 85.7494$ | | |
| $d_{26} = 2.3200$ | $n_{14} = 1.48749$ | $v_{14} = 70.20$ |
| $r_{27} = -60.3714$ | | |
| $d_{27} = 2.0000$ | | |
| $r_{28} = 18.1062$ | | |
| $d_{28} = 2.6400$ | $n_{15} = 1.51728$ | $v_{15} = 69.68$ |
| $r_{29} = 19.6489$ | | |
| $d_{29} = D_4$ (variable) | | |
| $r_{30} = 46.0868$ | | |
| $d_{30} = 2.2000$ | $n_{16} = 1.51728$ | $v_{16} = 69.68$ |
| $r_{31} = 37.8442$ | | |

| | W | S | T |
|---|---|---|---|
| f | 36.17 | 68.97 | 131.51 |
| $D_1$ | 0.950 | 13.696 | 23.550 |
| $D_2$ | 17.500 | 8.885 | 0.740 |
| $D_3$ | 8.267 | 4.703 | 2.830 |
| $D_4$ | 3.880 | 15.980 | 29.357 |

$|f_2/f_1| = 0.243$   $|\beta_{3W} \cdot \beta_{4W}| = 1.24095$
$\beta_5 = 1.07663$

Embodiment 7
f = 36.17~131.51 F/4.6~5.83
2ω = 61.8°~18.6°

| | | |
|---|---|---|
| $r_1 = 98.3186$ | | |
| $d_1 = 1.7290$ | $n_1 = 1.80518$ | $v_1 = 25.43$ |
| $r_2 = 47.6114$ | | |
| $d_2 = 5.5720$ | $n_2 = 1.60311$ | $v_2 = 60.70$ |
| $r_3 = -450.6904$ | | |
| $d_3 = 0.1400$ | | |
| $r_4 = 32.0255$ | | |
| $d_4 = 3.7280$ | $n_3 = 1.49700$ | $v_3 = 81.61$ |
| $r_5 = 80.3075$ | | |
| $d_5 = D_1$ (variable) | | |
| $r_6 = 55.6792$ | | |
| $d_6 = 1.0396$ | $n_4 = 1.72600$ | $v_4 = 53.56$ |
| $r_7 = 13.4642$ | | |
| $d_7 = 4.6595$ | | |
| $r_8 = -48.0800$ | | |
| $d_8 = 0.9704$ | $n_5 = 1.77250$ | $v_5 = 49.66$ |
| $r_9 = 37.5274$ | | |
| $d_9 = 0.1474$ | | |
| $r_{10} = 24.4363$ | | |
| $d_{10} = 3.1493$ | $n_6 = 1.84666$ | $v_6 = 23.88$ |
| $r_{11} = -62.7688$ | | |
| $d_{11} = 0.8647$ | | |
| $r_{12} = -26.0611$ | | |
| $d_{12} = 0.9394$ | $n_7 = 1.77250$ | $v_7 = 49.66$ |
| $r_{13} = 233946.4762$ | | |
| $d_{13} = D_2$ (variable) | | |
| $r_{14} = \infty$ (stop) | | |
| $d_{14} = 1.5966$ | | |
| $r_{15} = 55.1811$ | | |
| $d_{15} = 2.0852$ | $n_8 = 1.51821$ | $v_8 = 65.04$ |

-continued

Embodiment 7
f = 36.17~131.51 F/4.6~5.83
2ω = 61.8°~18.6°

$r_{16} = -44.2646$
$d_{16} = 0.1487$
$r_{17} = 33.4277$
$d_{17} = 3.8347$    $n_9 = 1.54072$    $\nu_9 = 47.20$
$r_{18} = -22.5857$
$d_{18} = 0.9985$    $n_{10} = 1.80518$    $\nu_{10} = 25.43$
$r_{19} = 453.2581$
$d_{19} = D_2$ (variable)
$r_{20} = 50.5328$
$d_{20} = 2.5458$    $n_{11} = 1.74077$    $\nu_{11} = 27.79$
$r_{21} = -122.1906$
$d_{21} = 0.9597$
$r_{22} = 36.4823$
$d_{22} = 3.1796$    $n_{12} = 1.80518$    $\nu_{12} = 25.43$
$r_{23} = 17.5146$
$d_{23} = 2.2036$
$r_{24} = -128.7099$
$d_{24} = 1.9994$    $n_{13} = 1.48749$    $\nu_{13} = 70.20$
$r_{25} = -35.0634$
$d_{25} = 0.1375$
$r_{26} = 17.5864$
$d_{26} = 3.4828$    $n_{14} = 1.53113$    $\nu_{14} = 62.44$
$r_{27} = 20.1248$
$d_{27} = D_4$ (variable)
$r_{28} = 129.5396$
$d_{28} = 3.3239$    $n_{15} = 1.60342$    $\nu_{15} = 38.01$
$r_{29} = -38.5744$
$d_{29} = 1.1529$
$r_{30} = -31.5131$
$d_{30} = 1.4163$    $n_{16} = 1.79952$    $\nu_{16} = 42.24$
$r_{31} = -902.5520$

|       | W      | S      | T       |
|-------|--------|--------|---------|
| f     | 36.17  | 68.97  | 131.51  |
| $D_1$ | 0.700  | 13.851 | 24.531  |
| $D_2$ | 15.568 | 8.046  | 0.950   |
| $D_3$ | 10.086 | 4.374  | 0.806   |
| $D_4$ | 4.637  | 16.620 | 27.328  |

$|f_2/f_1| = 0.231$    $|\beta_{3W} \cdot \beta_{4W}| = 1.33489$
$\beta_5 = 1.10432$

Embodiment 8
f = 36~131.5 F/4.6~5.8
2ω = 61.8°~18.6°

$r_1 = 76.1754$
$d_1 = 1.5000$    $n_1 = 1.80518$    $\nu_1 = 25.43$
$r_2 = 43.2140$
$d_2 = 5.6500$    $n_2 = 1.60311$    $\nu_2 = 60.70$
$r_3 = 1040.6700$
$d_3 = 0.1400$
$r_4 = 34.5606$
$d_4 = 3.7000$    $n_3 = 1.48749$    $\nu_3 = 70.20$
$r_5 = 74.8048$
$d_5 = D_1$ (variable)
$r_6 = 39.6311$
$d_6 = 0.9906$    $n_4 = 1.77250$    $\nu_4 = 49.66$
$r_7 = 14.2966$
$d_7 = 5.4894$
$r_8 = -140.2604$
$d_8 = 1.0000$    $n_5 = 1.77250$    $\nu_5 = 49.66$
$r_9 = 43.5522$
$d_9 = 0.2161$
$r_{10} = 24.1347$
$d_{10} = 3.3820$    $n_6 = 1.84666$    $\nu_6 = 23.78$
$r_{11} = -1333.1697$
$d_{11} = 1.1813$
$r_{12} = -35.8078$
$d_{12} = 1.1421$    $n_7 = 1.77250$    $\nu_7 = 49.66$
$r_{13} = -1314.5680$
$d_{13} = 0.4611$
$r_{14} = -76.1812$ (aspherical surface)
$d_{14} = 0.9953$    $n_8 = 1.56883$    $\nu_8 = 56.34$
$r_{15} = 83.8345$
$d_{15} = D_2$ (variable)
$r_{16} = \infty$ (stop)
$d_{16} = 1.0994$ -continued

Embodiment 8
f = 36~131.5 F/4.6~5.8
2ω = 61.8°~18.6°

$r_{17} = 43.0900$
$d_{17} = 2.4154$    $n_9 = 1.71300$    $\nu_9 = 53.84$
$r_{18} = -79.6829$
$d_{18} = 0.0796$
$r_{19} = 42.9463$
$d_{19} = 2.4490$    $n_{10} = 1.50378$    $\nu_{10} = 66.81$
$r_{20} = -59.8975$
$d_{20} = 0.4790$
$r_{21} = -31.3533$
$d_{21} = 1.2574$    $n_{11} = 1.80518$    $\nu_{11} = 25.43$
$r_{22} = 293.6913$
$d_{22} = D_3$ (variable)
$r_{23} = 53.8701$
$d_{23} = 2.4878$    $n_{12} = 1.74000$    $\nu_{12} = 28.29$
$r_{24} = -74.2982$
$d_{24} = 0.3919$
$r_{25} = 53.9970$
$d_{25} = 1.9863$    $n_{13} = 1.80518$    $\nu_{13} = 25.43$
$r_{26} = 20.8593$
$d_{26} = 2.1653$
$r_{27} = -2370.0809$
$d_{27} = 2.3787$    $n_{14} = 1.48749$    $\nu_{14} = 70.20$
$r_{28} = -34.2604$
$d_{28} = 0.2693$
$r_{29} = 19.4728$
$d_{29} = 2.6341$    $n_{15} = 1.53996$    $\nu_{15} = 59.57$
$r_{30} = 21.6198$
$d_{30} = D_4$ (variable)
$r_{31} = 62.8450$
$d_{31} = 3.2790$    $n_{16} = 1.62004$    $\nu_{16} = 36.25$
$r_{32} = -573.3112$
$d_{32} = 1.2338$
$r_{33} = -56.8940$
$d_{33} = 1.8332$    $n_{17} = 1.80610$    $\nu_{17} = 40.95$
$r_{34} = -819.8327$ aspherical surface coefficient
$E = 0.69182 \times 10^{-5}$    $F = 0.14743 \times 10^{-7}$
$G = 0.46809 \times 10^{-9}$    $H = -0.82329 \times 10^{-11}$    $I = 0.31735 \times 10^{-13}$

|       | W      | S      | T      |
|-------|--------|--------|--------|
| f     | 36     | 68.8   | 131.5  |
| $D_1$ | 0.676  | 13.215 | 26.396 |
| $D_2$ | 17.601 | 8.776  | 1.370  |
| $D_3$ | 8.849  | 3.821  | 0.461  |
| $D_4$ | 9.098  | 22.260 | 27.431 |

$|f_2/f_1| = 4.329$    $|\beta_{3W} \cdot \beta_{4W}| = 1.225$
$\beta_5 = 1.0383$ wherein the reference symbols $r_1$, $r_2$, ... represent the radii of curvature on the surfaces of the respective lens elements, the reference symbols $d_1$, $d_2$, ... designate the thicknesses of the respective lens elements and the airspaces reserved therebetween, the reference symbols $n_1$, $n_2$, ... denote the refractive indices of the respective lens elements, and the reference symbols $\nu_1$, $\nu_2$, ... represents the Abbe's numbers of the respective lens elements.

The Embodiment 1 has the composition illustrated in FIG. 1 and is designed as a zoom lens system having a vari-focal range of f=36.13 to 131.5 from the wide position to the tele position thereof. In the Embodiment 1, the first lens unit comprises at least one cemented doublet (this cemented doublet may be separated into two lens elements) and a positive lens element, and is composed so as not to correct chromatic aberration sufficiently. The second lens unit comprises at least one air lens and a lens element arranged on the image side for correcting coma. The third lens unit comprises at least one cemented doublet, to which a positive lens element should desirably be added. From the manufacturing viewpoint, performance of this zoom lens system can be stabilized by arranging an air lens therein and holding the lens elements with high precision. The fourth lens unit is adopted as an imaging lens unit and may be designed as the so-called triplet type. It is effective for reserving the required back focal length and correcting aberrations to control the location of the principal point by arranging a positive lens element on the image side in the fourth lens unit. The fifth lens unit is composed of a positive lens element and a negative lens element which are arranged so as to compose an air lens therebetween, thereby correcting curvature of field very favorably. It is possible to compose the fifth lens unit of a single lens element but, in such a case, a favorable effect can be obtained by using an aspherical surface.

The Embodiment 2 has a composition which is similar to that of the Embodiment 1.

In the Embodiment 3, the fourth lens unit is composed of three positive, positive and negative lens elements, and an aspherical surface is used.

The Embodiment 4 is a zoom lens system which is similar to the Embodiment 2, but the second lens unit of the Embodiment 4 comprises a negative lens element in place of the cemented doublet.

In each of the Embodiments 5 and 6, the fifth lens unit is composed of a single negative lens element. The Embodiment 5 uses an aspherical surface which has a function substituting for an air lens, thereby correcting the aberrations of high orders and imparting favorable performance to the zoom lens system.

The Embodiment 7 has a composition which is to that of the Embodiment 4, but uses a cemented doublet in the third lens unit.

Figure 8:
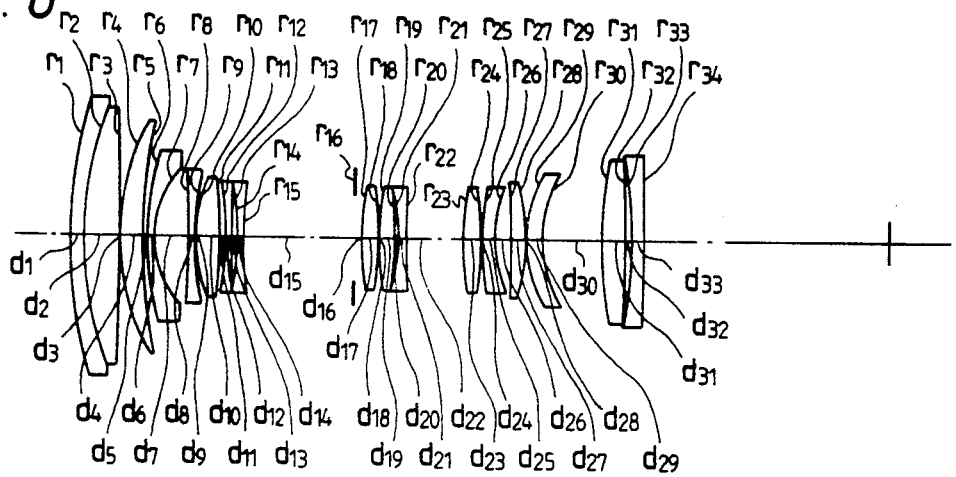
Figure 9:
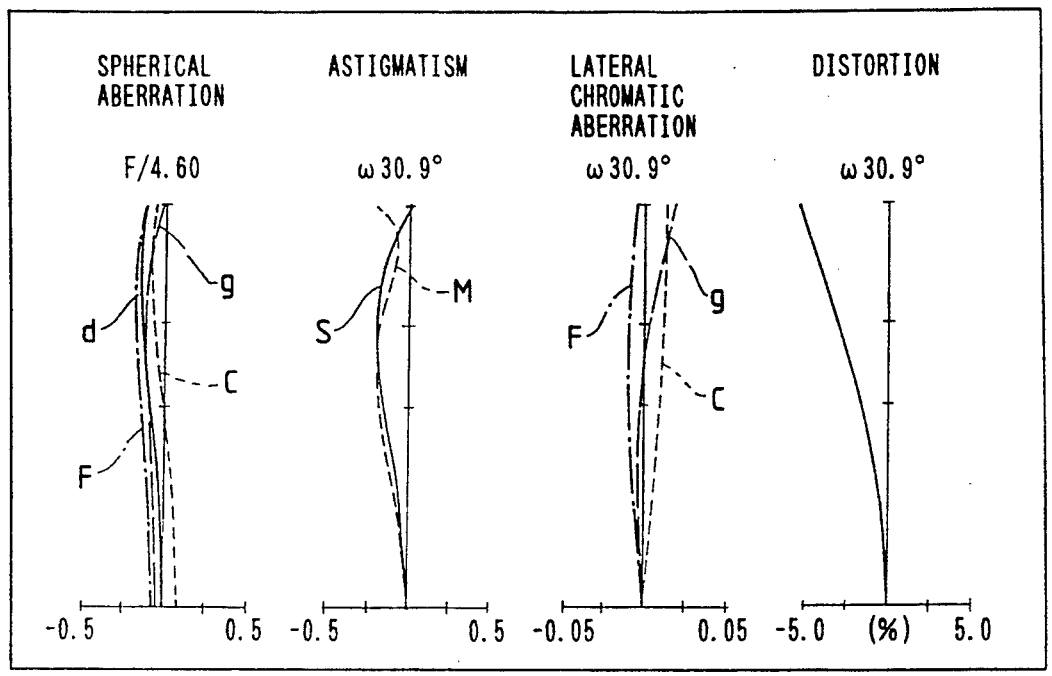
FIG. 9, FIG. 10 and FIG. 11 show curves illustrating aberration characteristics at the wide position, intermediate focal length and tele position respectively of the Embodiment 1 of the present invention.
Figure 10:
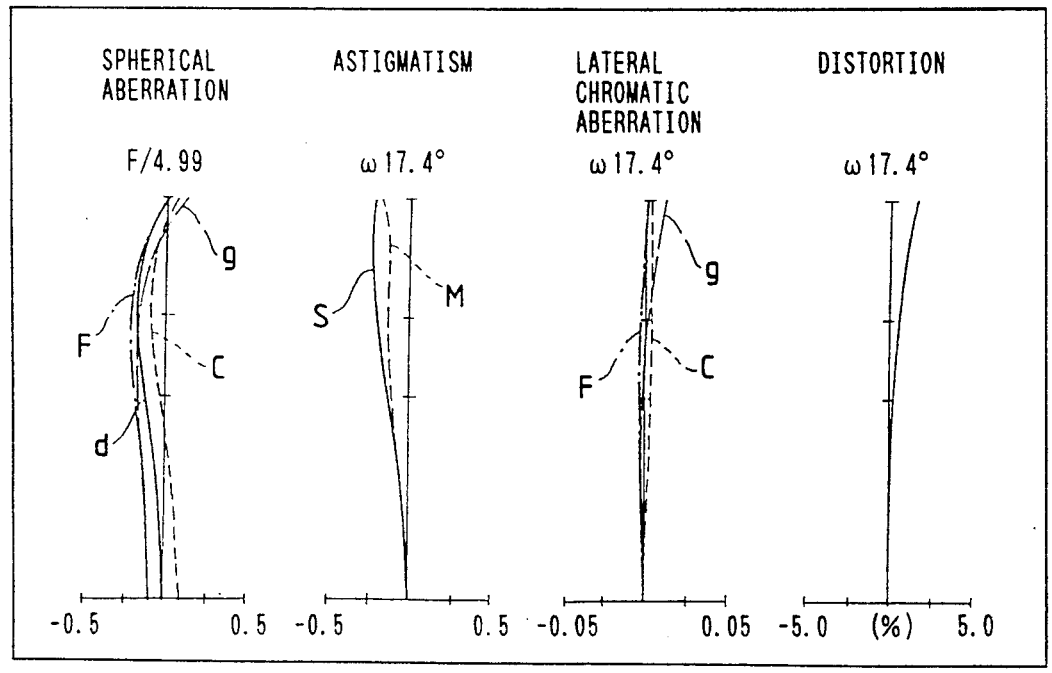
Figure 11:
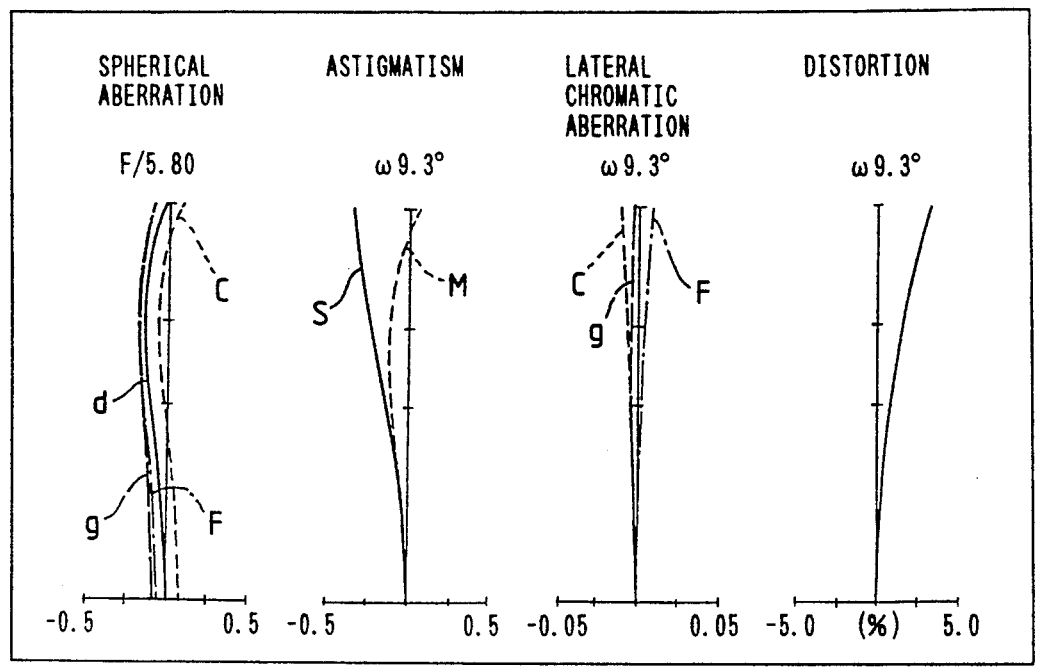
Figure 12:
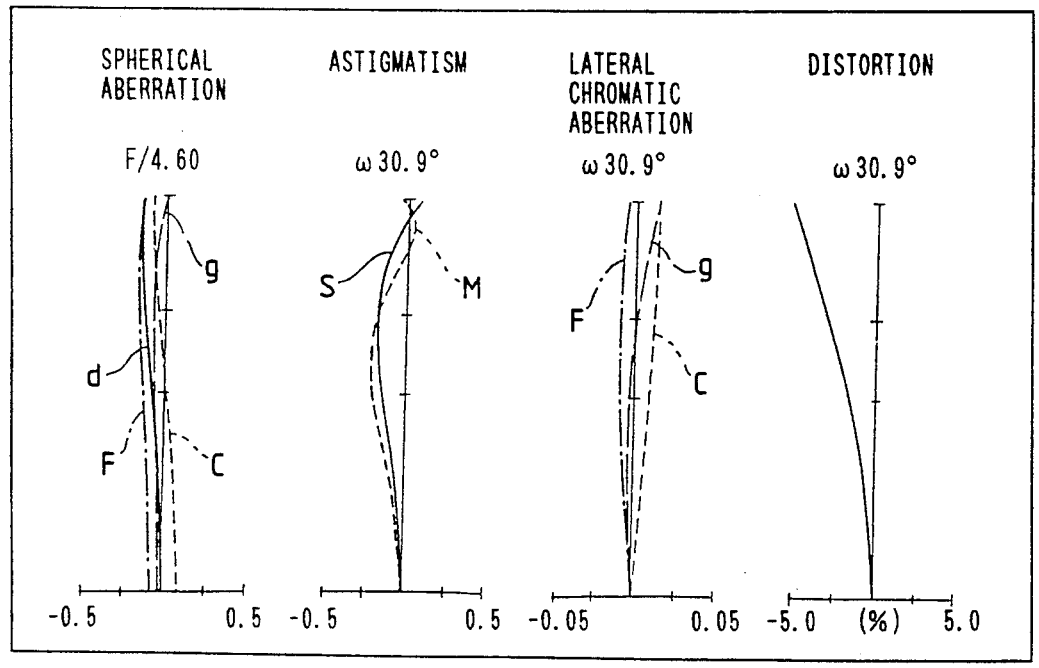
FIG. 12, FIG. 13 and FIG. 14 show curves illustrating aberration characteristics at the wide position, intermediate focal length and tele position respectively of the Embodiment 2 of the present invention.
Figure 13:
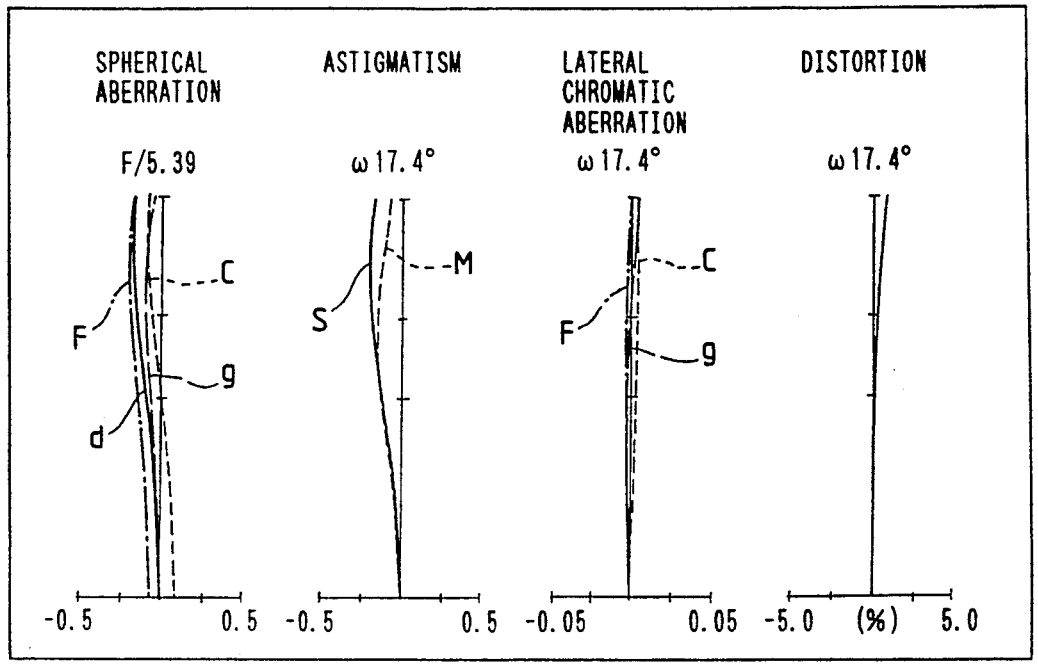
Figure 14:
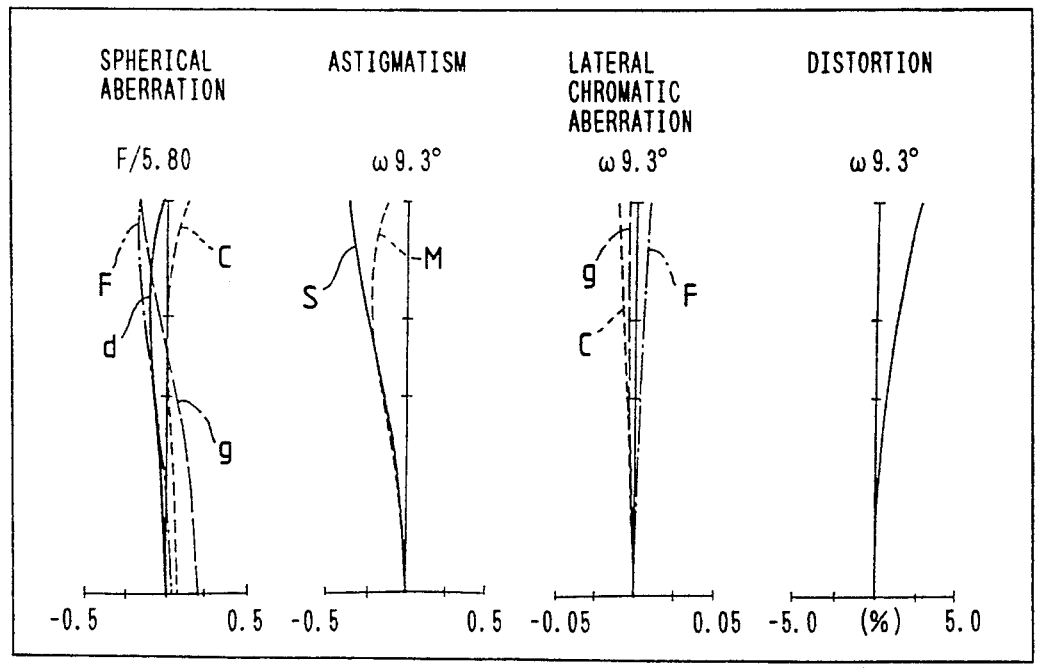
Figure 15:
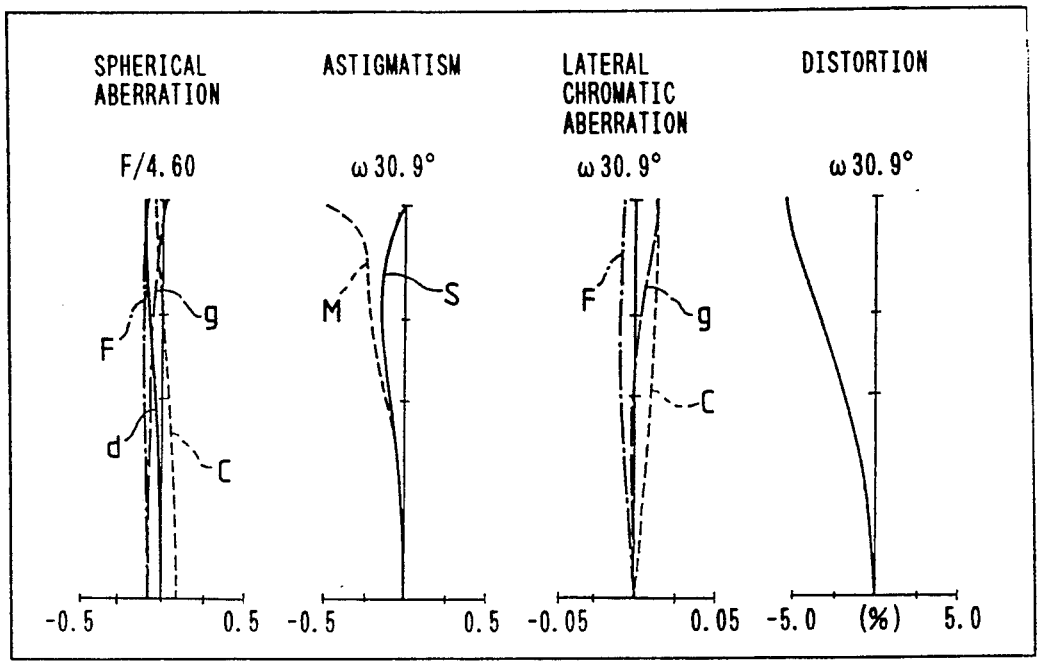
FIG. 15, FIG. 16 and FIG. 17 show curves illustrating aberration characteristics at the wide position, intermediate focal length and tele position respectively of the Embodiment 3 of the present invention.
Figure 16:
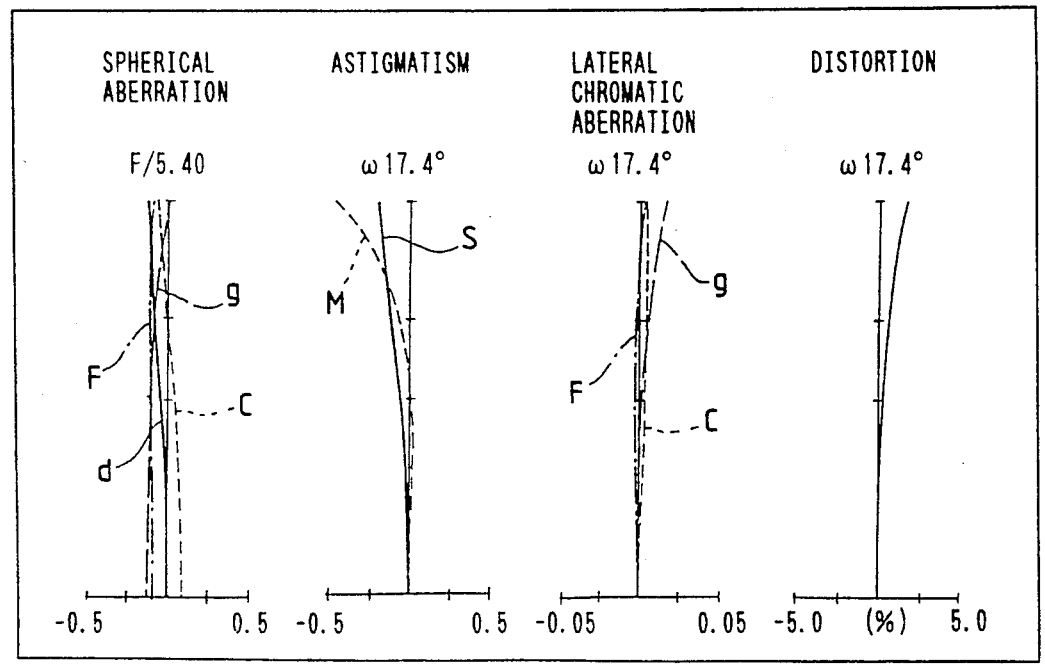
Figure 17:
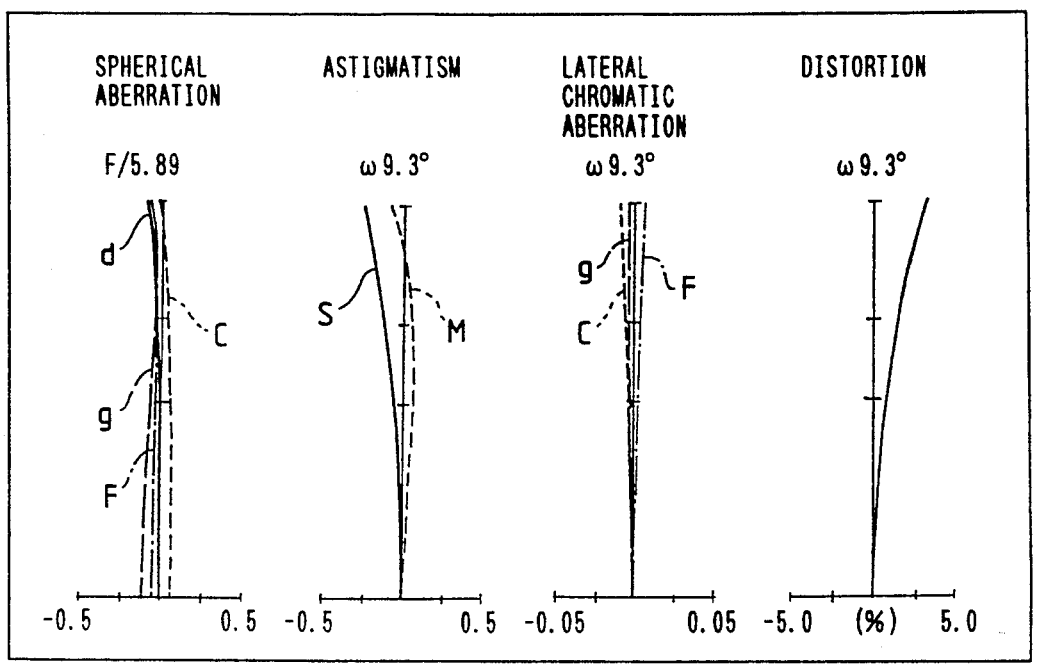
Figure 18:
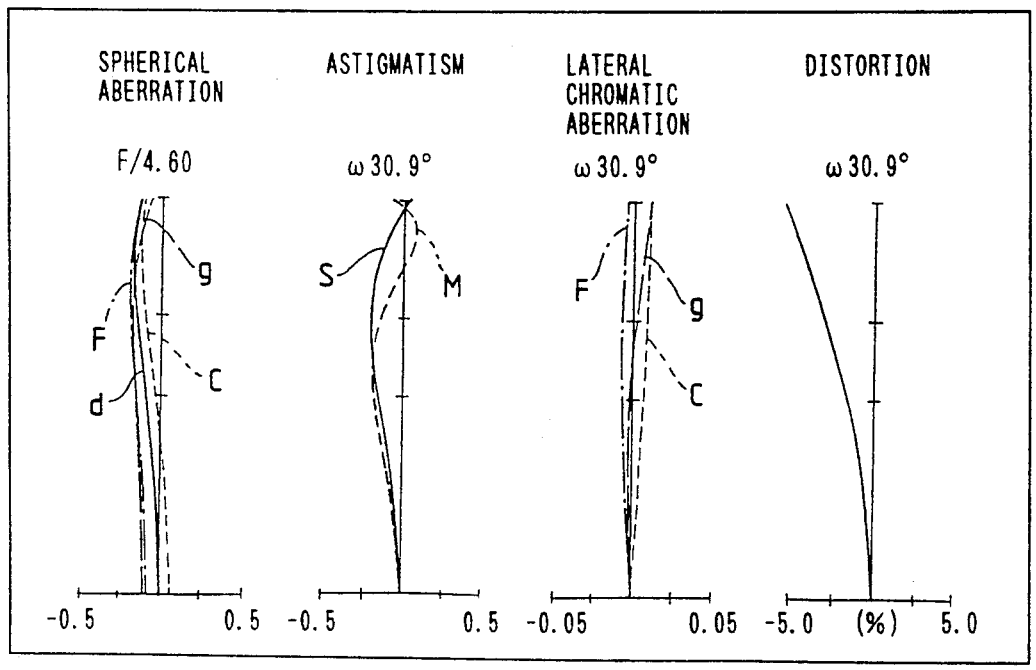
FIG. 18, FIG. 19 and FIG. 20 show graphs illustrating aberration characteristics at the wide position, intermediate focal length and tele position respectively of the Embodiment 4 of the present invention.
Figure 19:
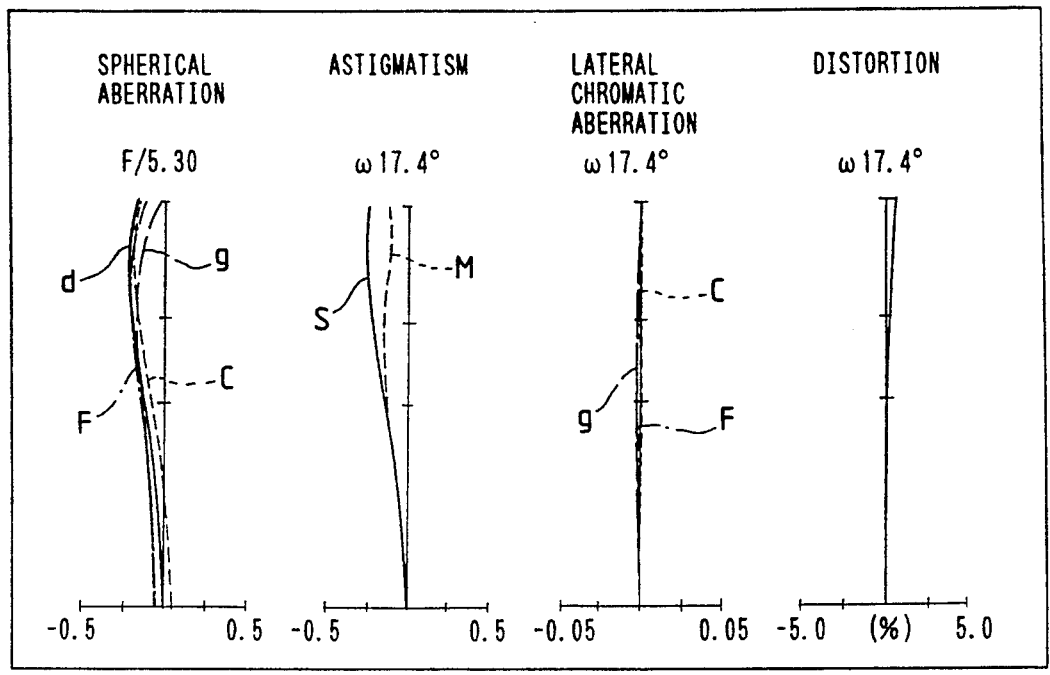
Figure 20:
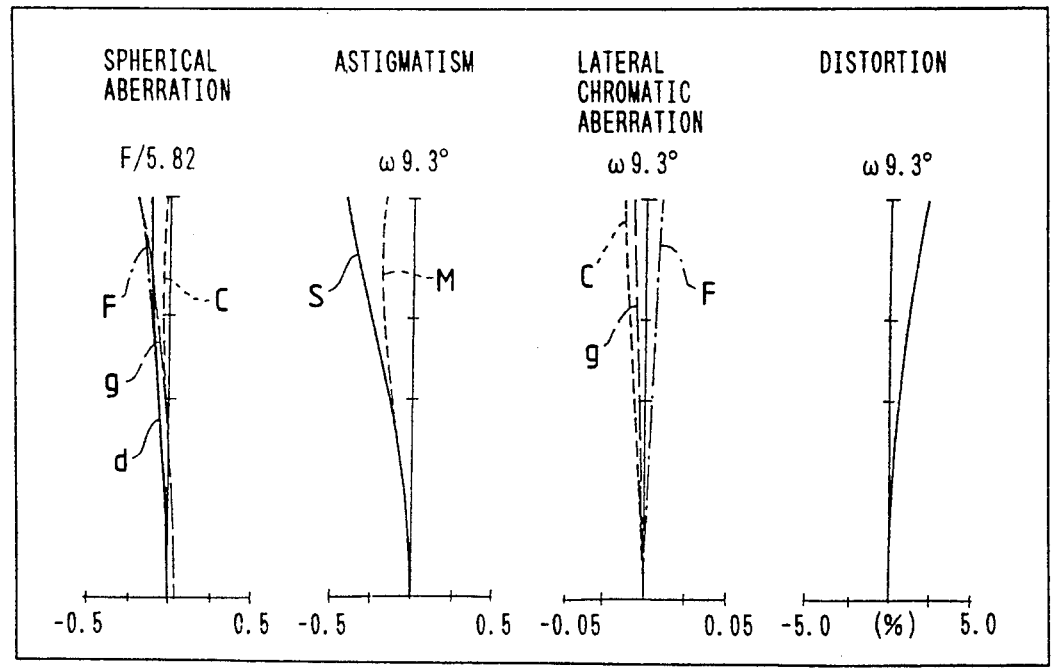
Figure 21:
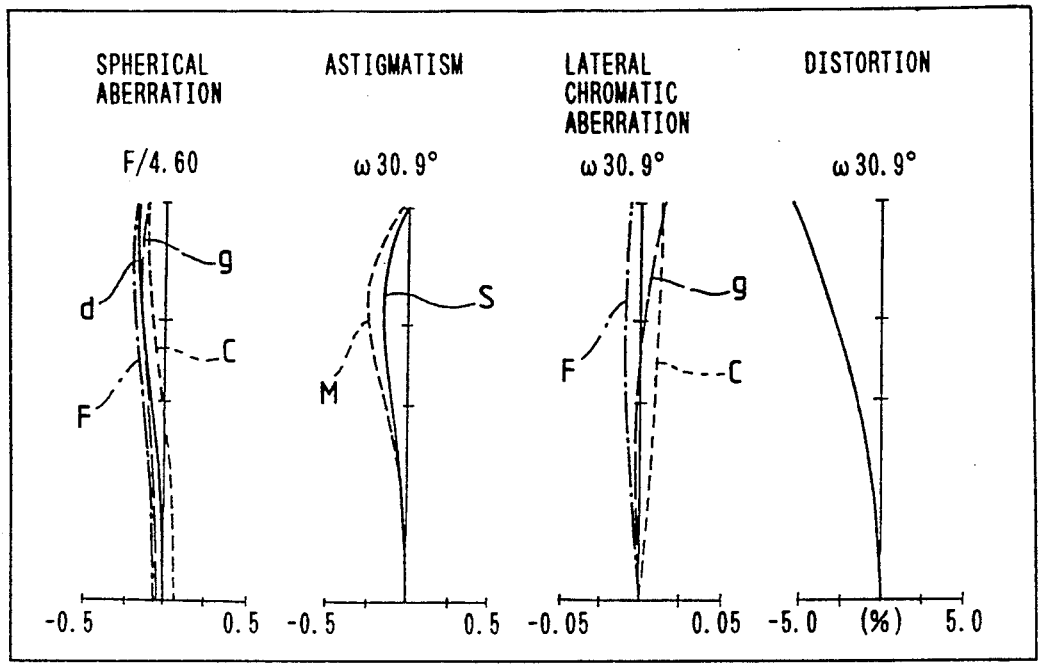
FIG. 21, FIG. 22 and FIG. 23 show graphs illustrating aberration characteristics at the wide position, intermediate focal length and tele position respectively of the Embodiment 5 of the present invention.
Figure 22:
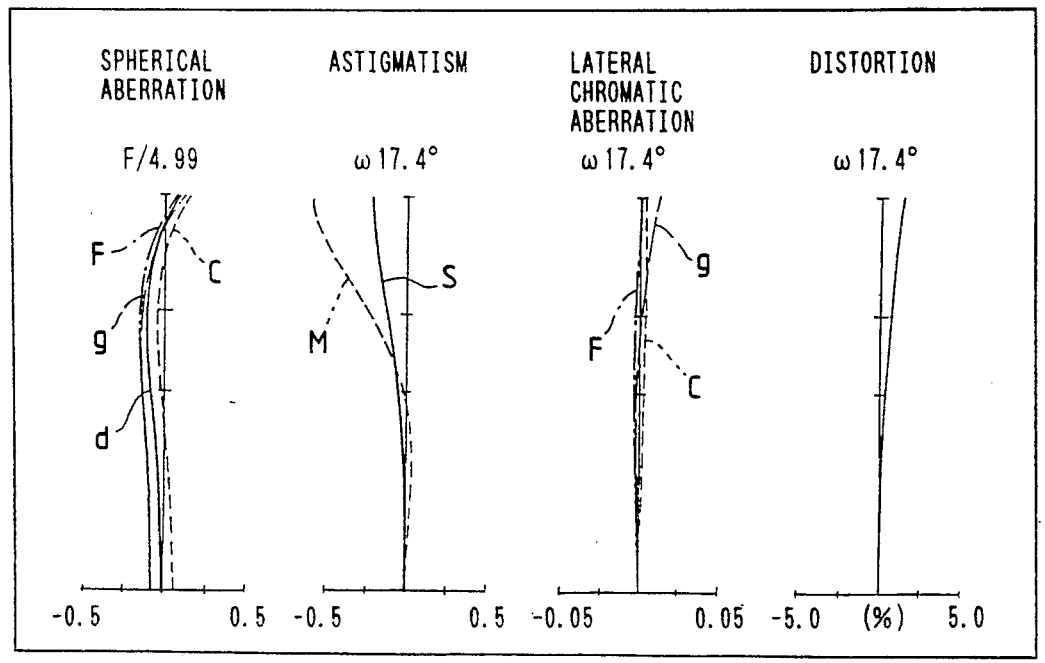
Figure 23:
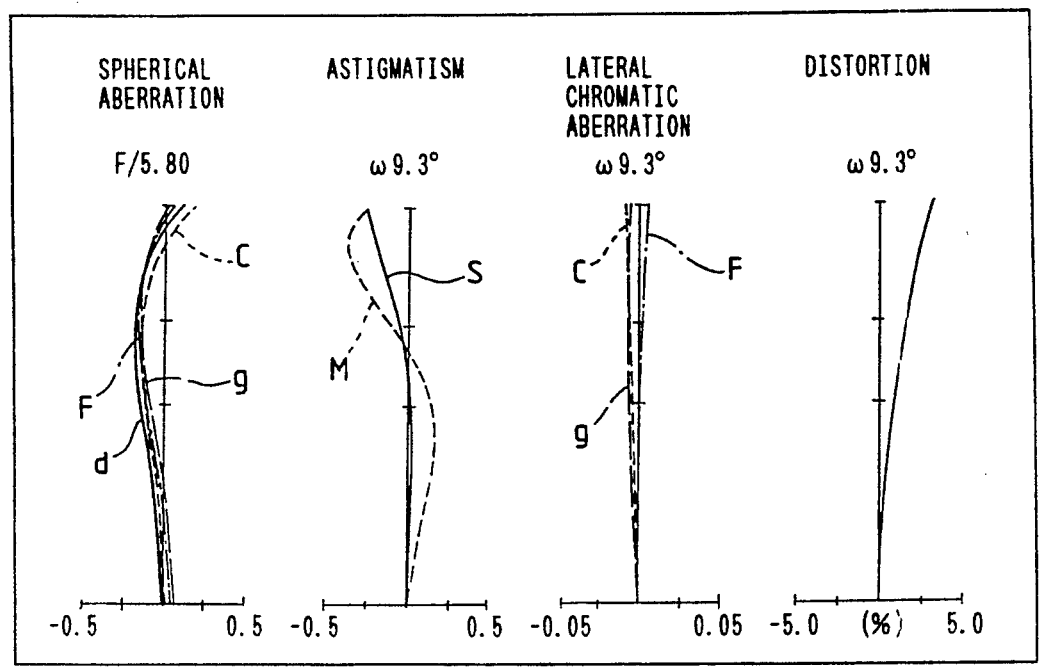
Figure 24:
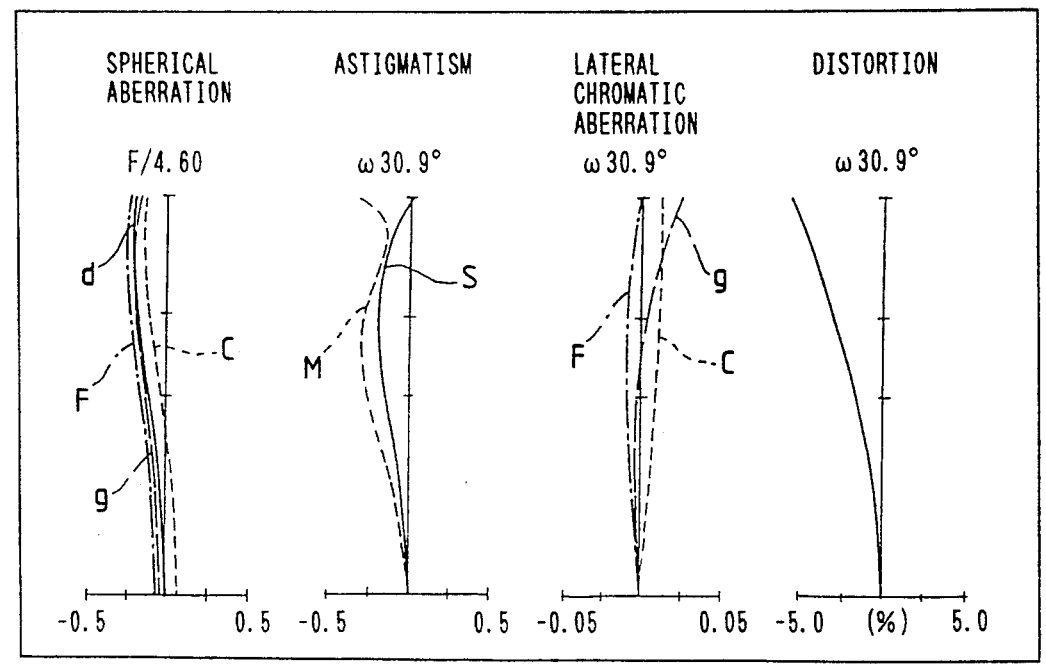
FIG. 24, FIG. 25 and FIG. 26 show curves illustrating aberration characteristics at the wide position, intermediate focal length and tele position respectively of the Embodiment 6 of the present invention.
Figure 25:
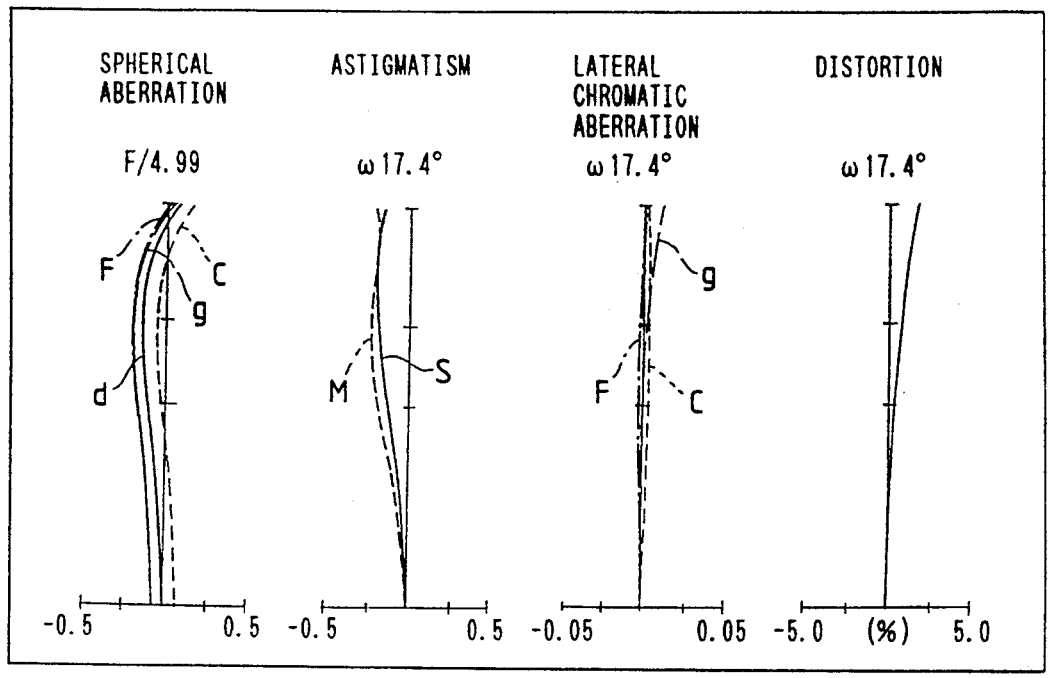
Figure 26:
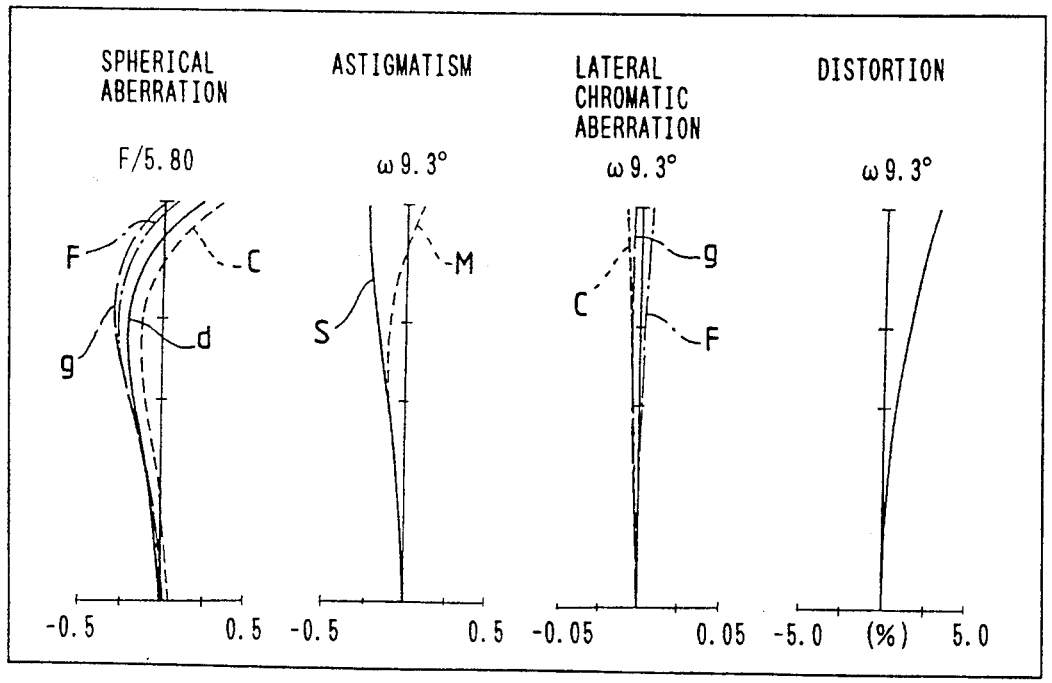
Figure 27:
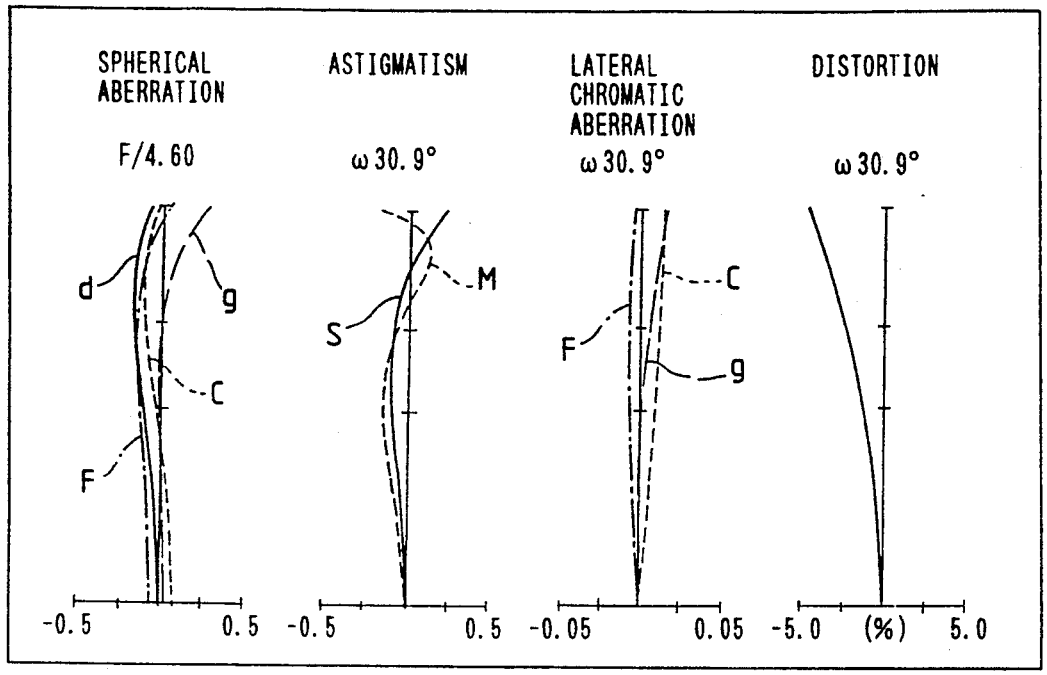
FIG. 27, FIG. 28 and FIG. 29 show graphs illustrating aberration characteristics at the wide position, intermediate focal length and tele position respectively of the Embodiment 7 of the present invention.
Figure 28:
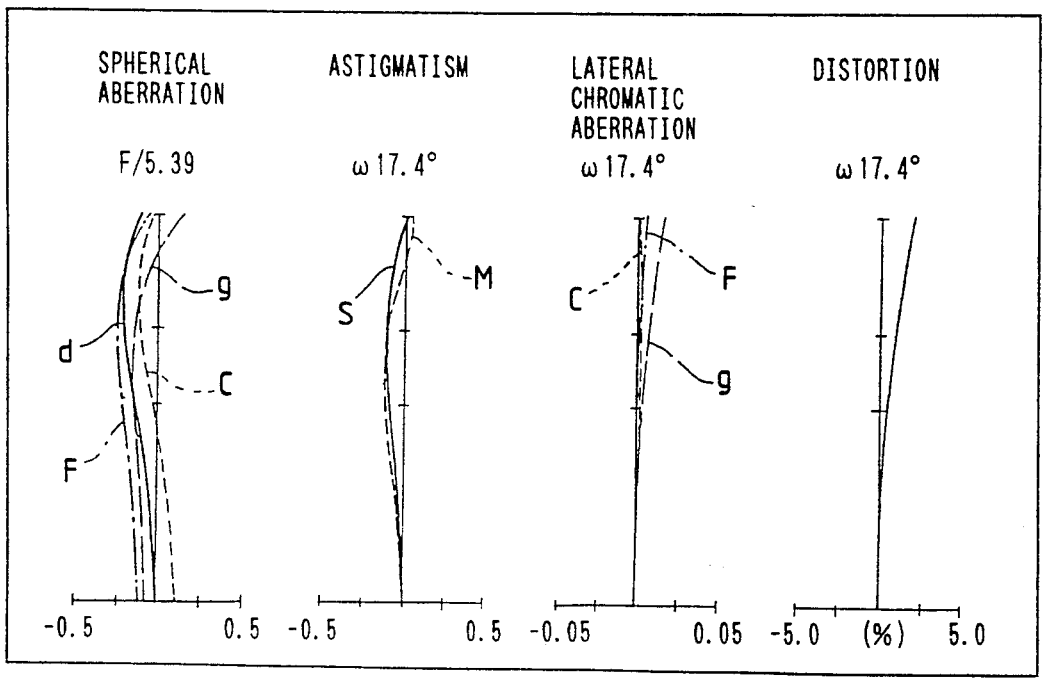
Figure 29:
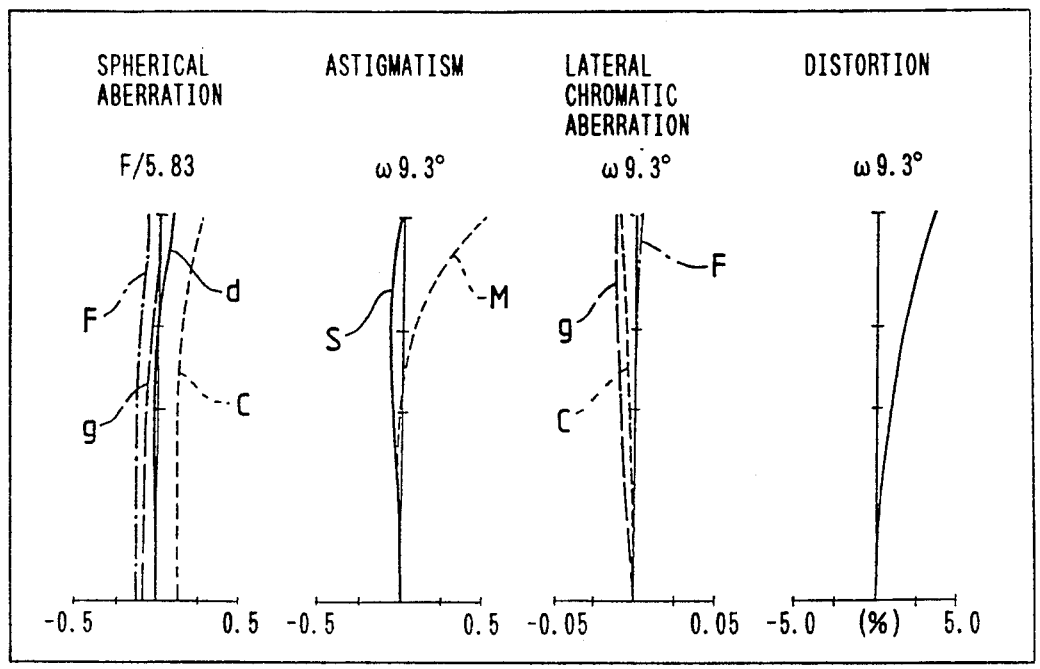
Figure 30:
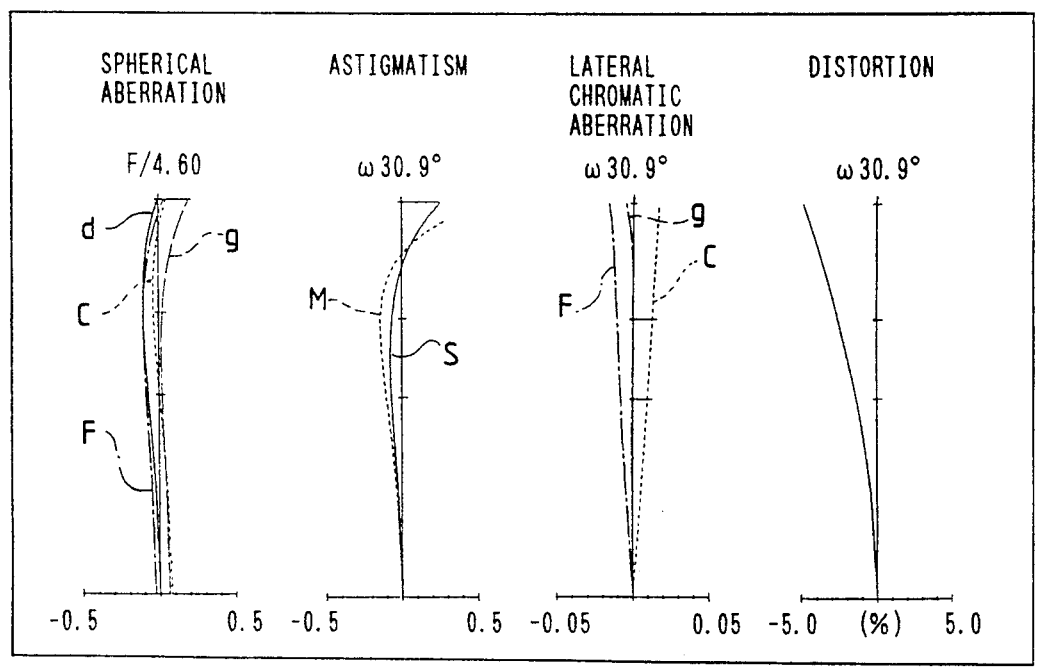
FIG. 30, FIG. 31 and FIG. 32 show curves illustrating aberration characteristics at the wide position, intermediate focal length and tele position respectively of the Embodiment 8 of the present invention.
Figure 31:
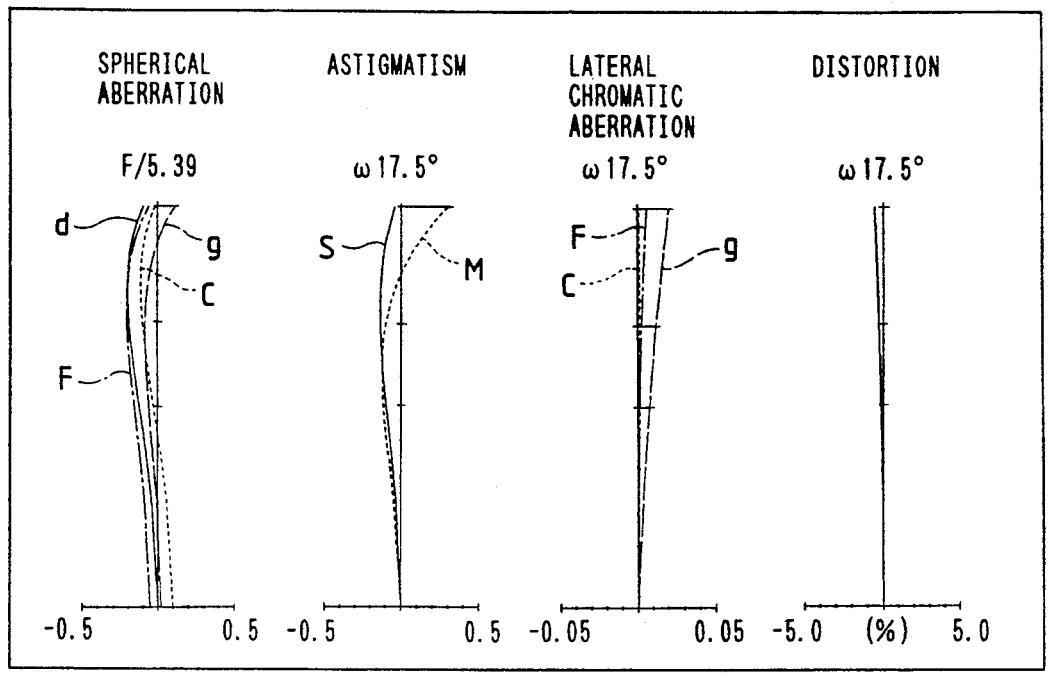
Figure 32:
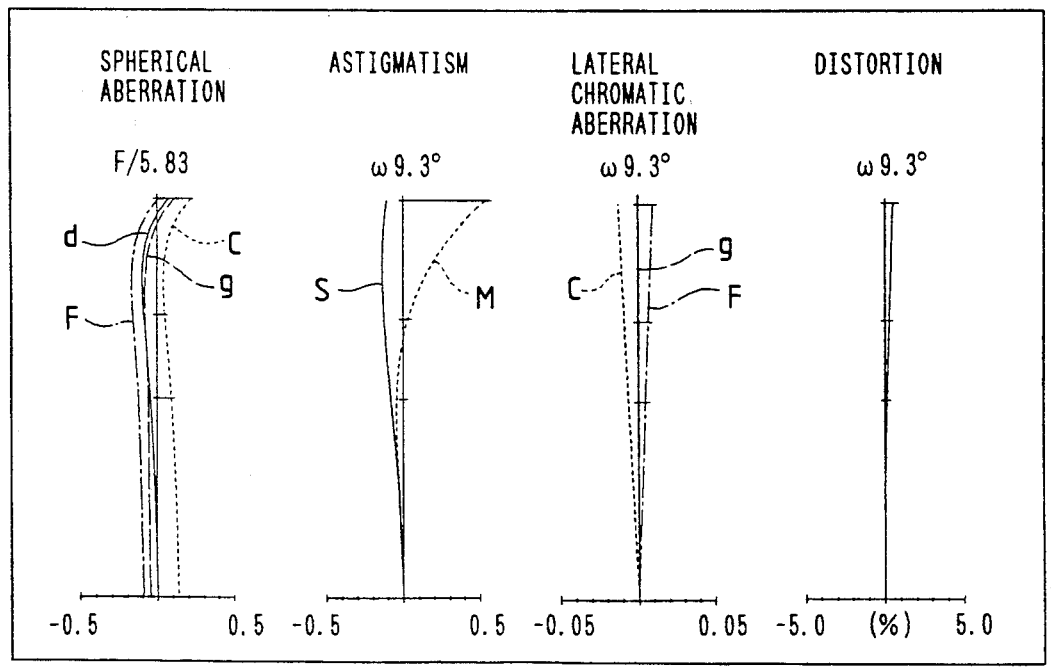
Figure 33:
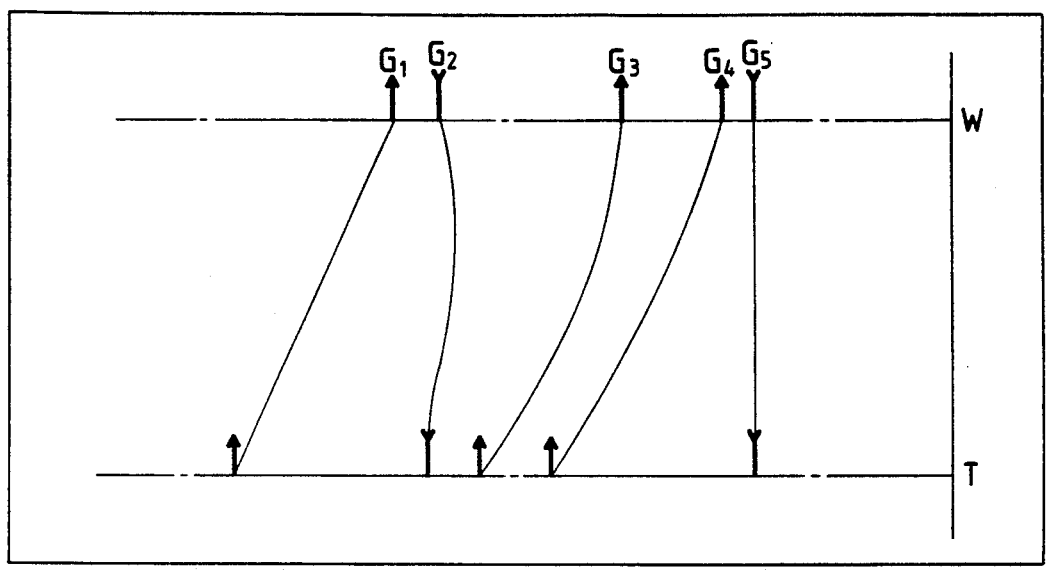
FIG. 33 and FIG. 34 show diagrams illustrating loci for moving the lens units for focusing the zoom lens system according to the present invention.
Figure 34:
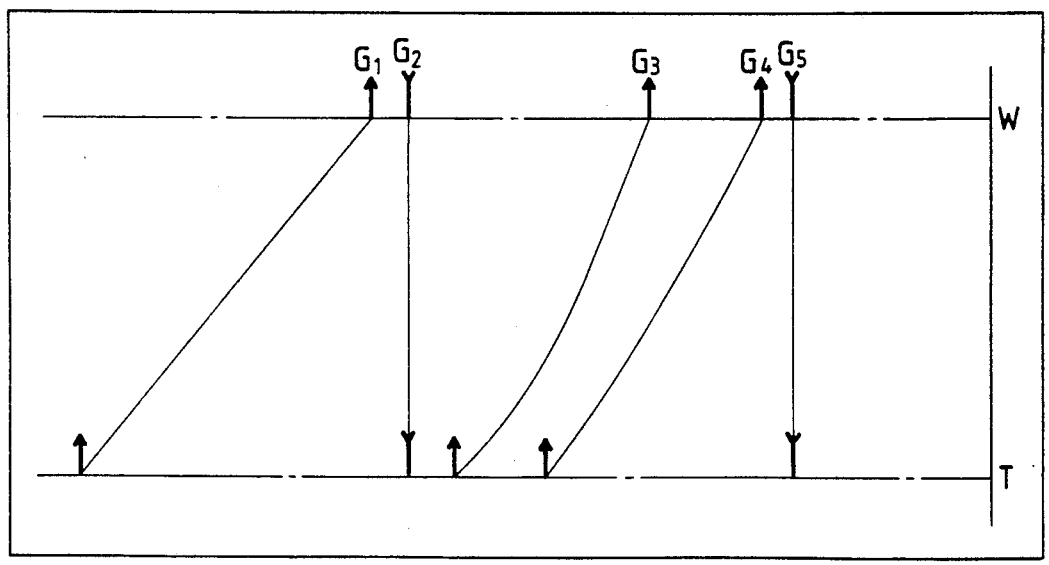
Figure 35:
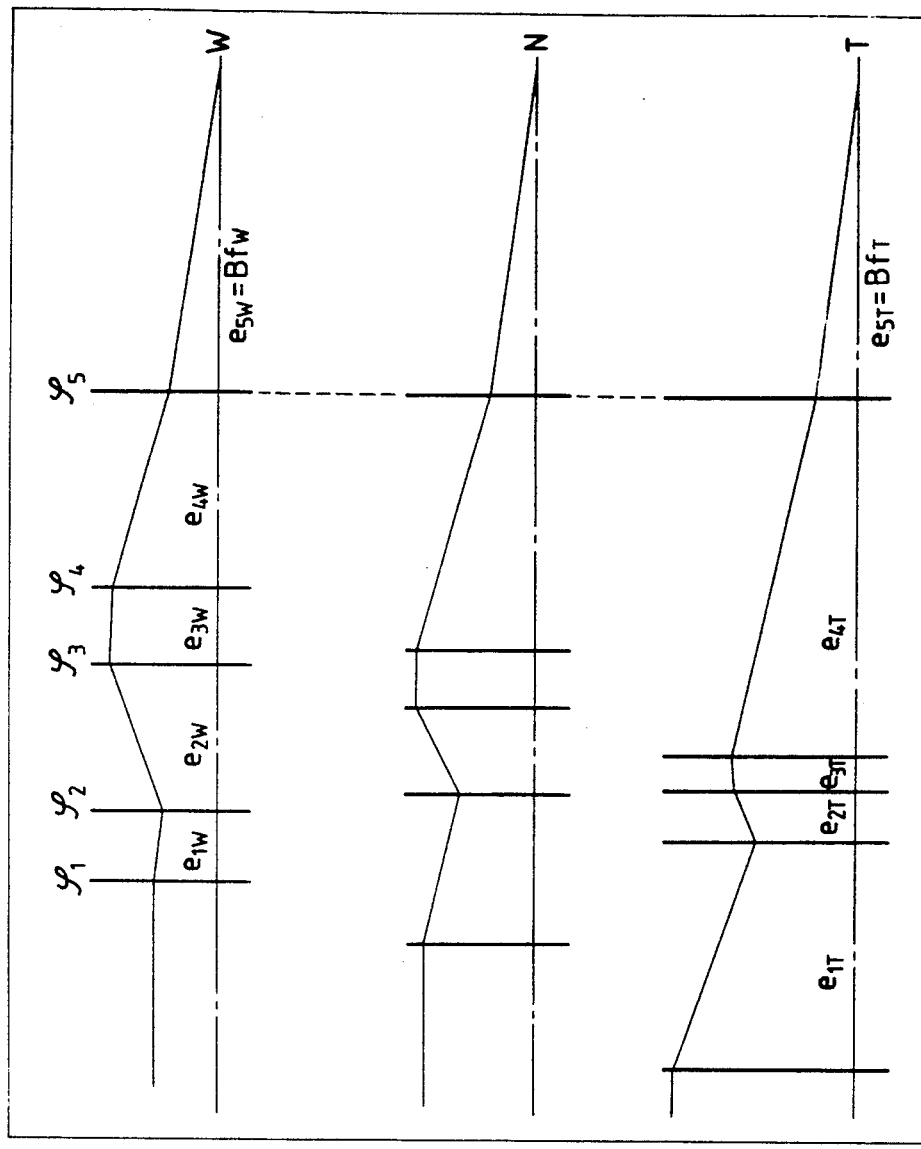
FIG. 35 shows diagrams illustrating paraxial refractive power distributions for the Embodiment 1 of the present invention.
Figure 36:
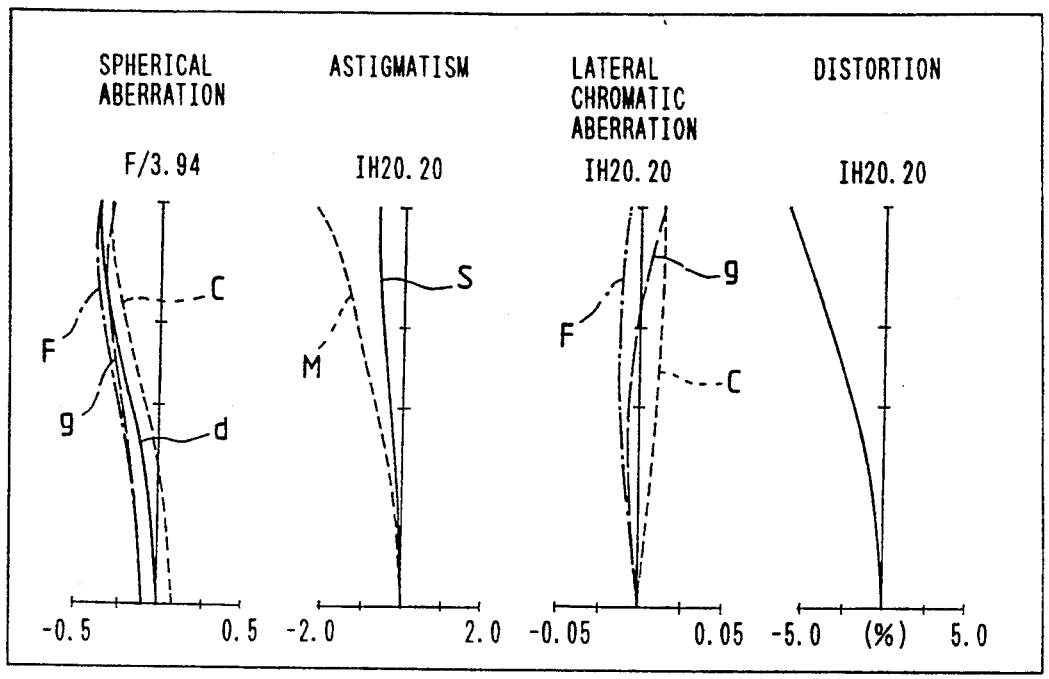
FIG. 36, FIG. 37 and FIG. 38 show curves illustrating aberration characteristics of the lens system composed of the first through fourth lens units used in the Embodiment 1 of the present invention.
Figure 37:
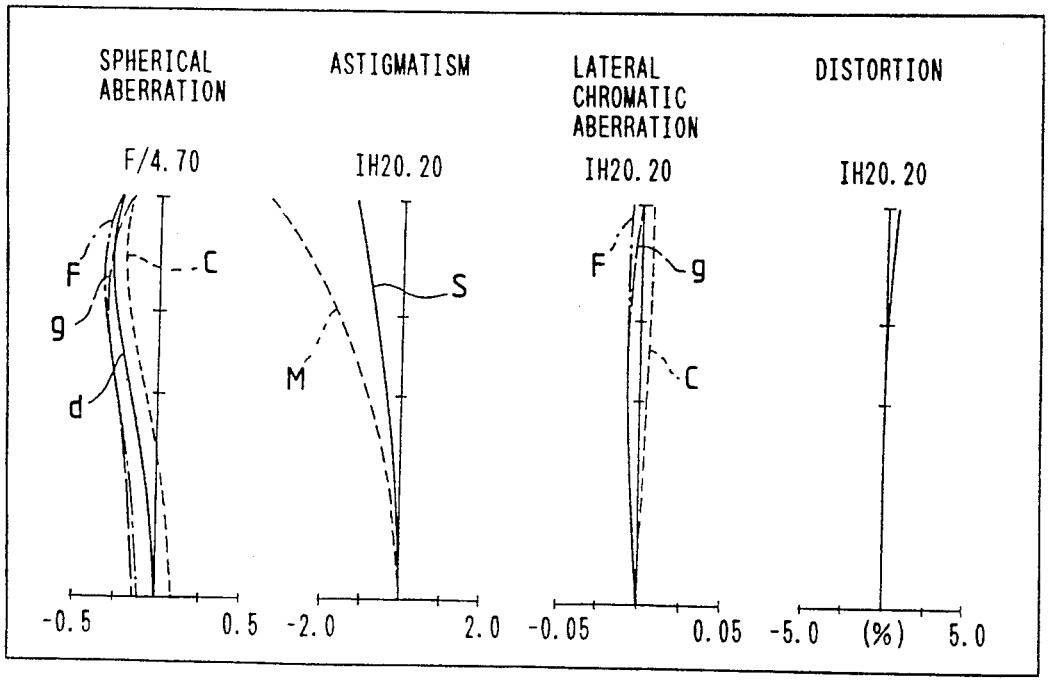
Figure 38:
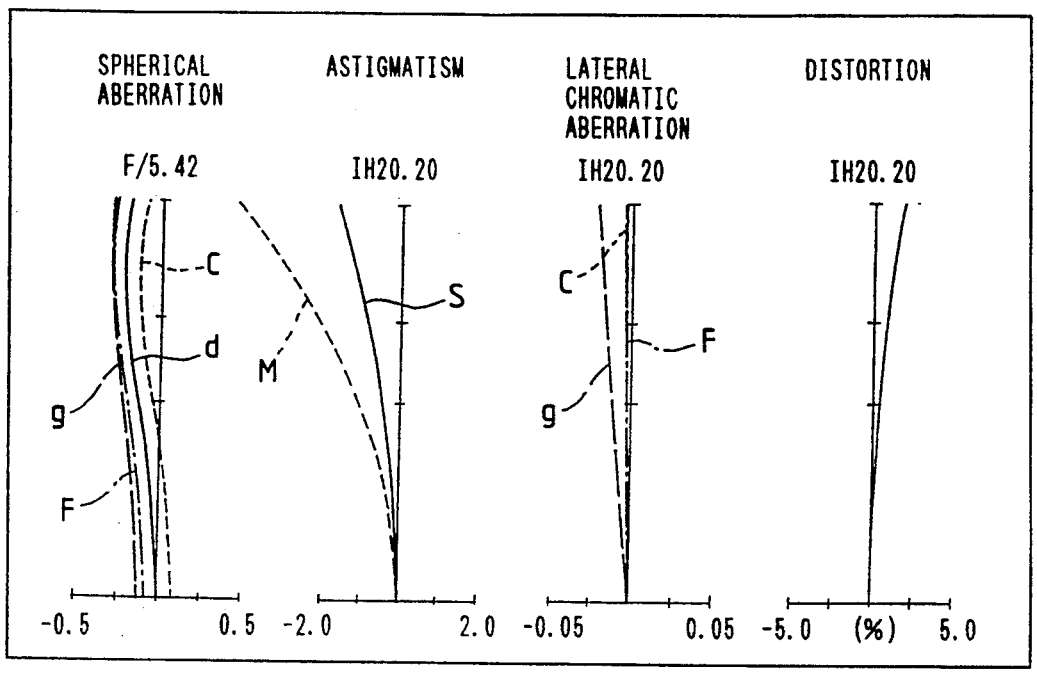
Figure 41:
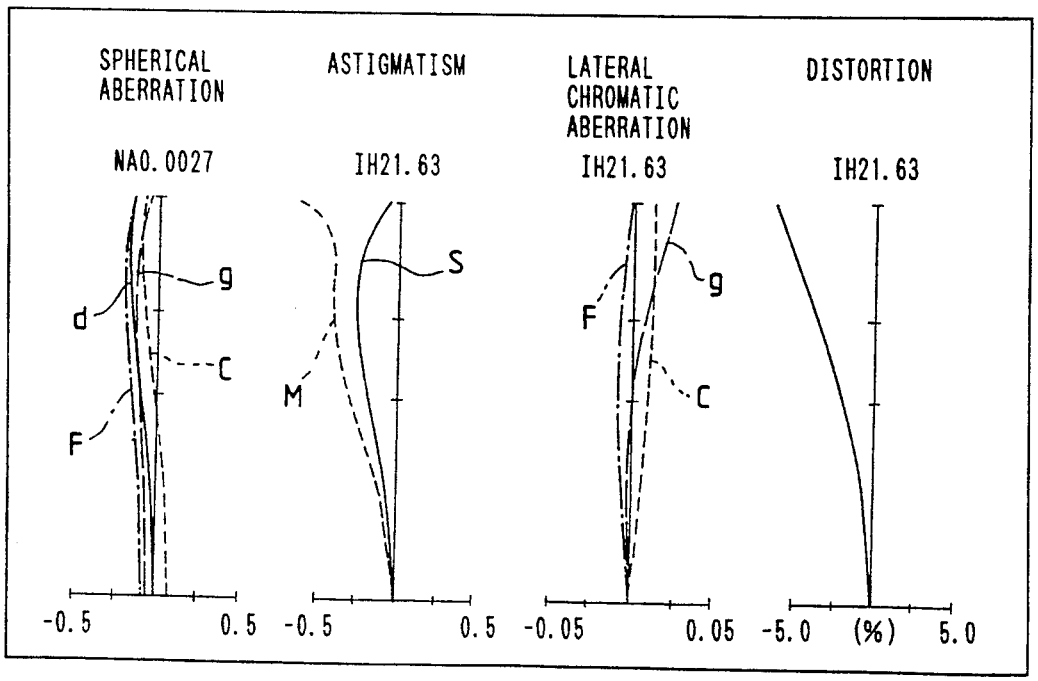
FIG. 41, FIG. 42 and FIG. 43 show curves illustrating aberration characteristics of the Embodiment 1 of the present invention when it is focused on an object located at a distance of 1.5 m by moving the third, fourth and fifth lens units.
Figure 39:
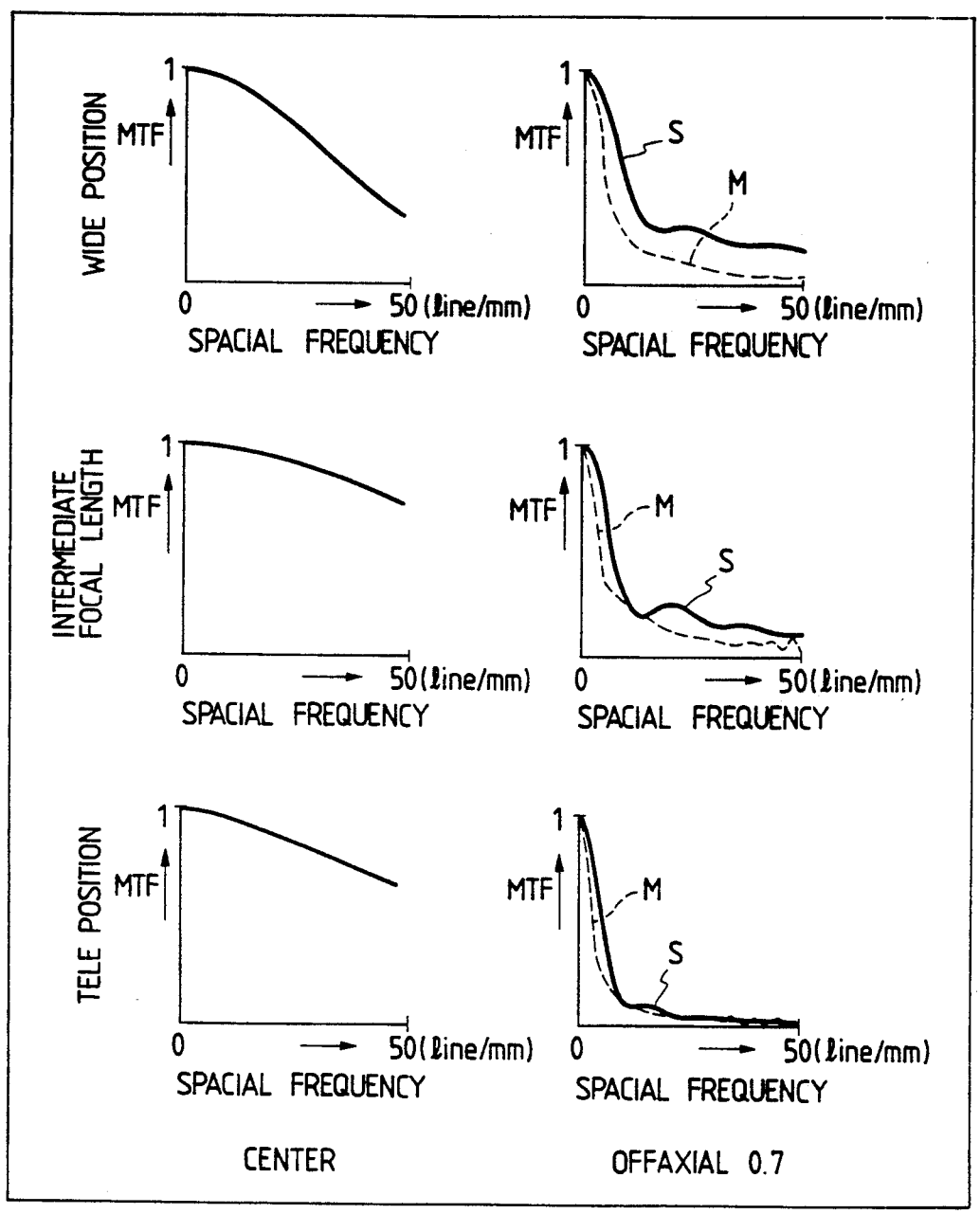
FIG. 39 show graphs illustrating modulation transfer functions of the lens system composed of the first thorugh fourth lens units used in the Embodiment 1 of the present invention.
Figure 40:
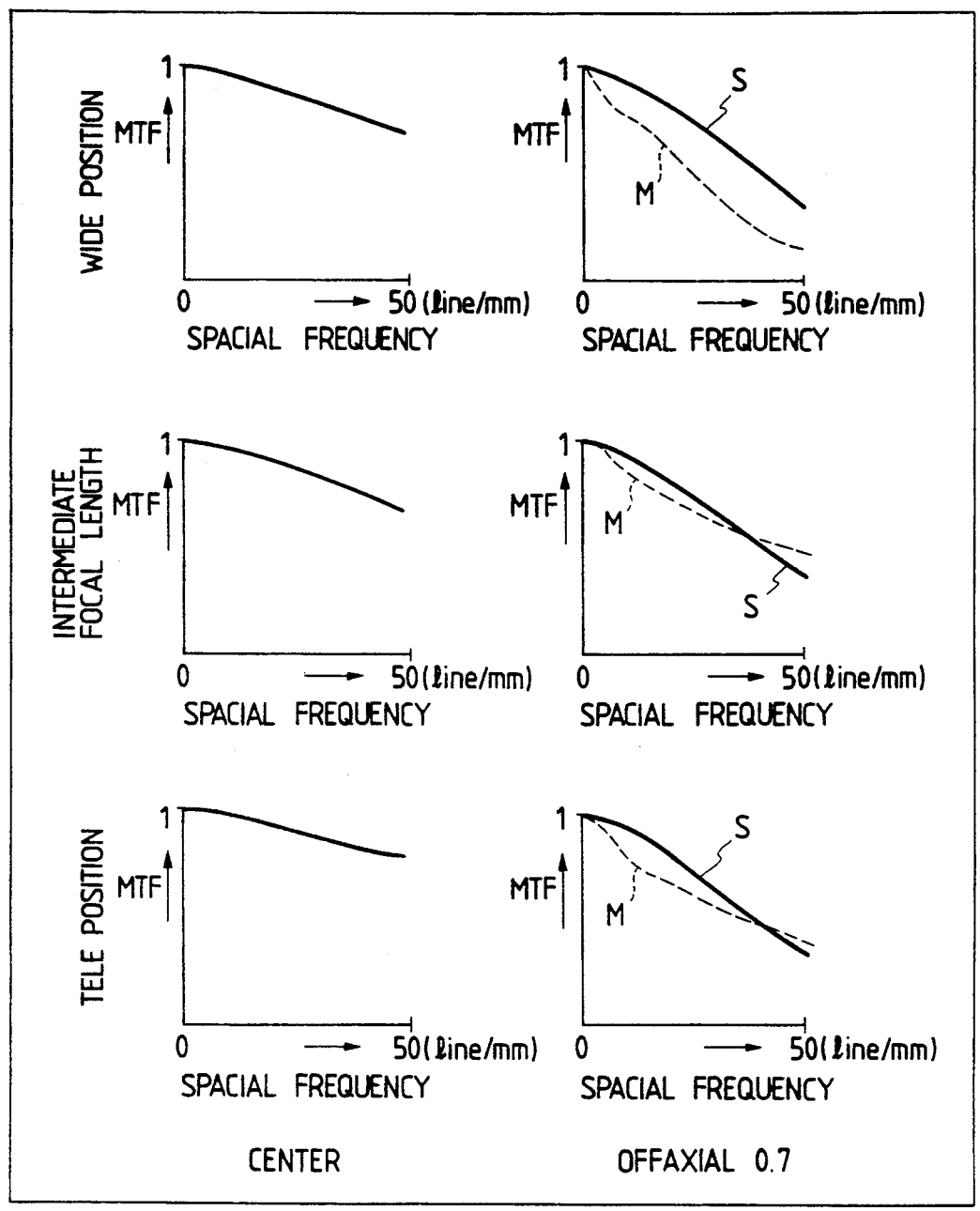
FIG. 40 shows graphs illustrating modulation transfer functions of the Embodiment 1 of the present invention.
Figure 42:
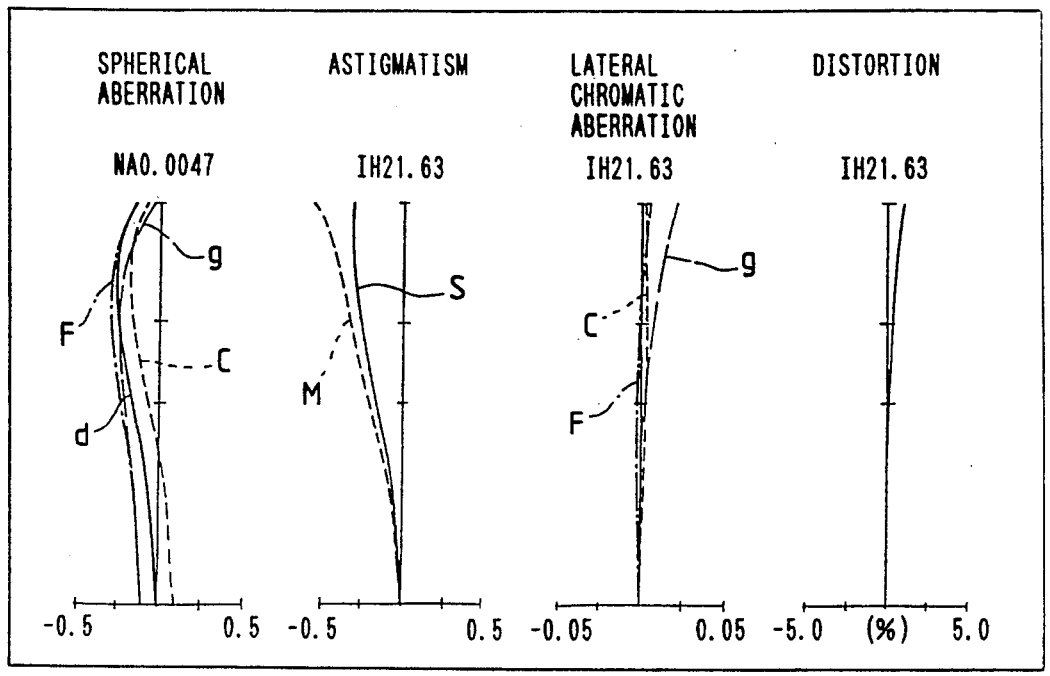
Figure 43:
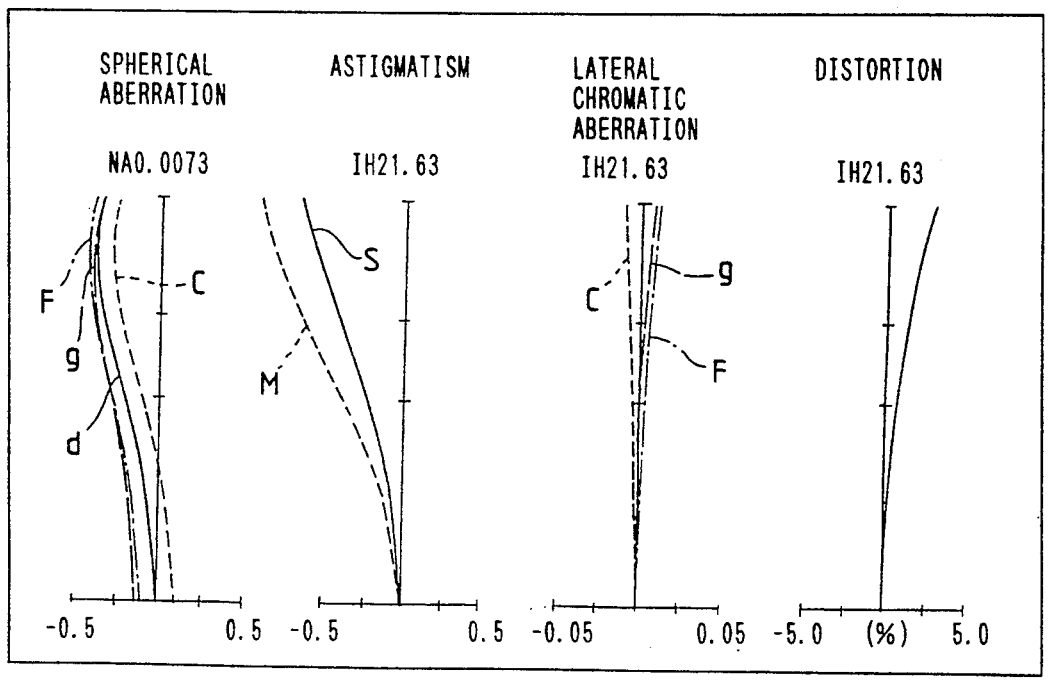
Figure 46:
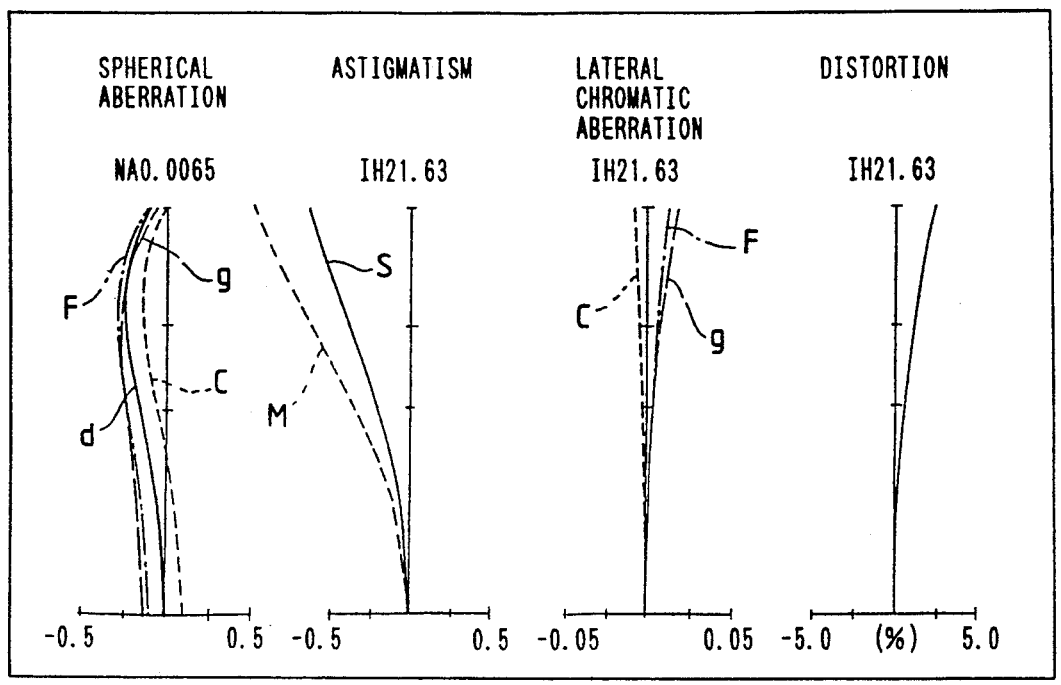
Figure 47:
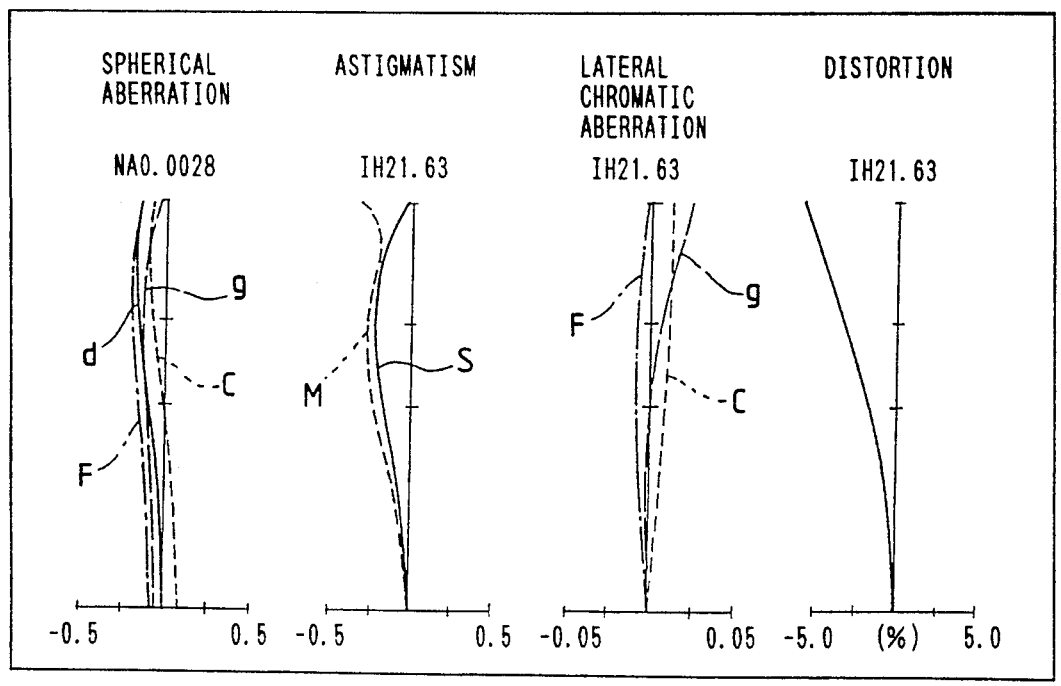
FIG. 47, FIG. 48 and FIG. 49 show curves illustrating aberration characteristics of the Embodiment 1 of the present invention when it is focused on an object located at a distance of 1.5 m by moving the first and second lens units.
Figure 48:
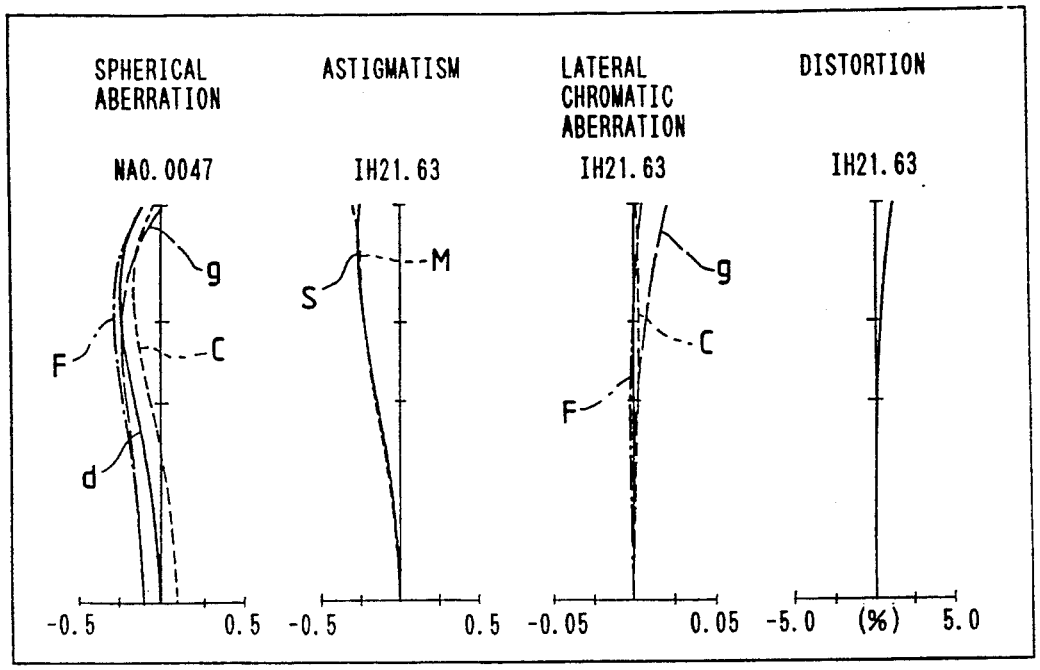
Figure 49:
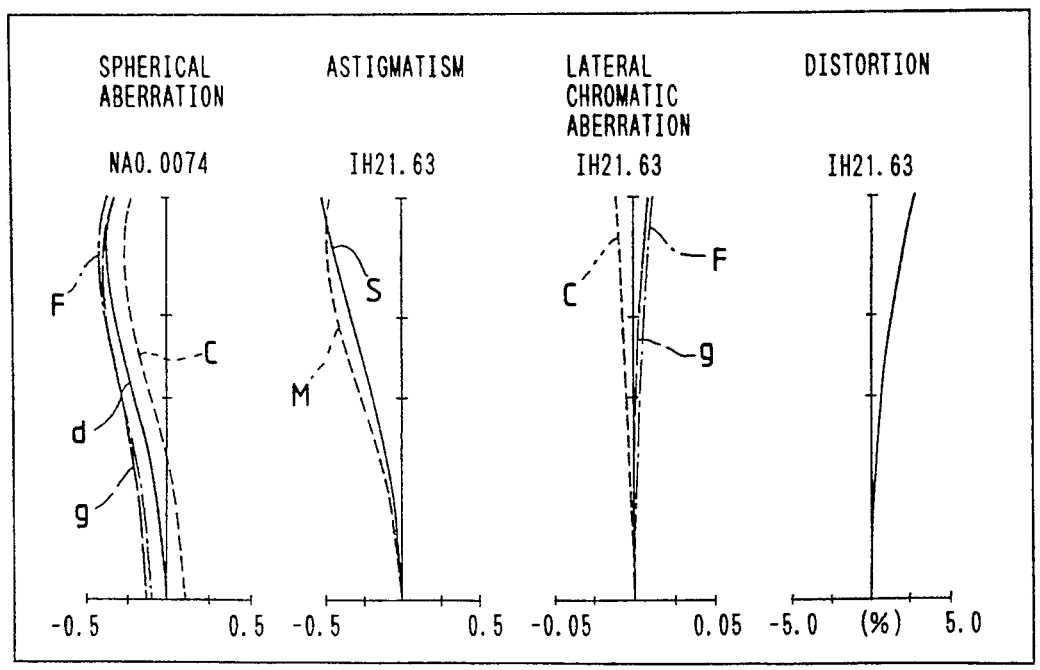

The Embodiment 8 has the composition illustrated in FIG. 8 wherein the second lens unit comprises two negative lens elements which are separated from each other and arranged on the image side.

Figure 50:
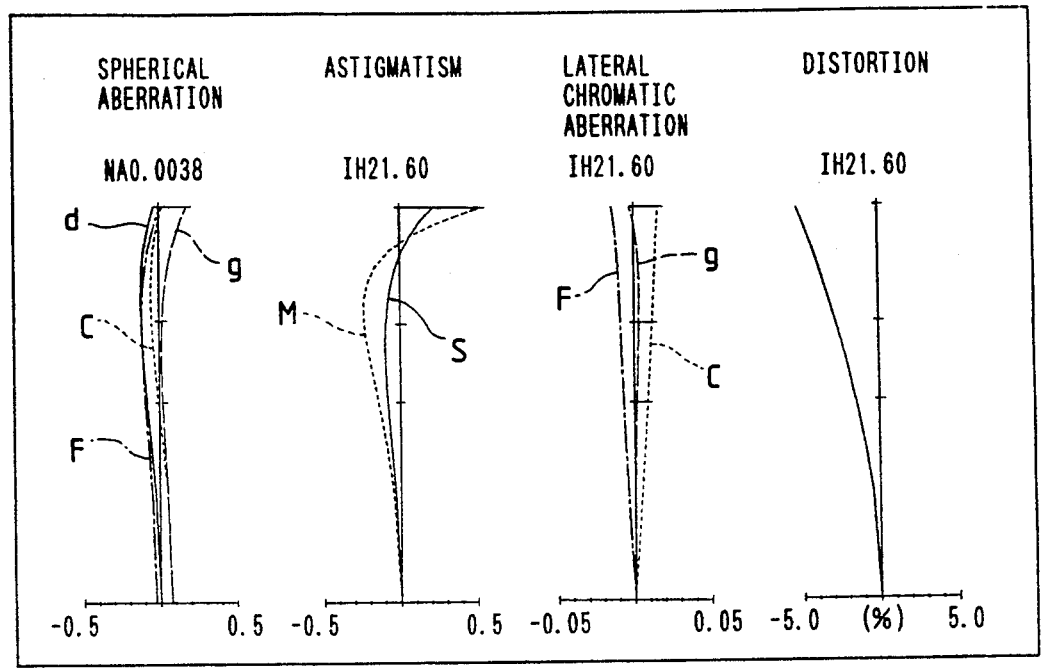
FIG. 50, FIG. 51 and FIG. 52 show curves illustrating aberration characteristics of the Embodiment 8 of the present invention when it is focused on an object located at a distance of 1.2 m by moving the first lens unit and the second lens unit.
Figure 51:
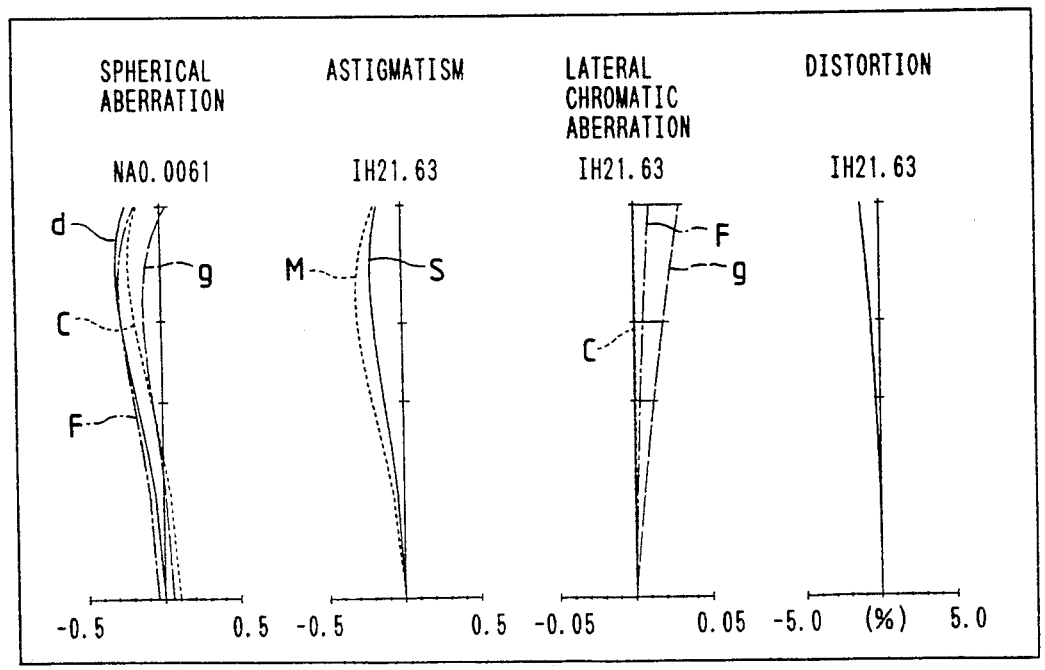
Figure 52:
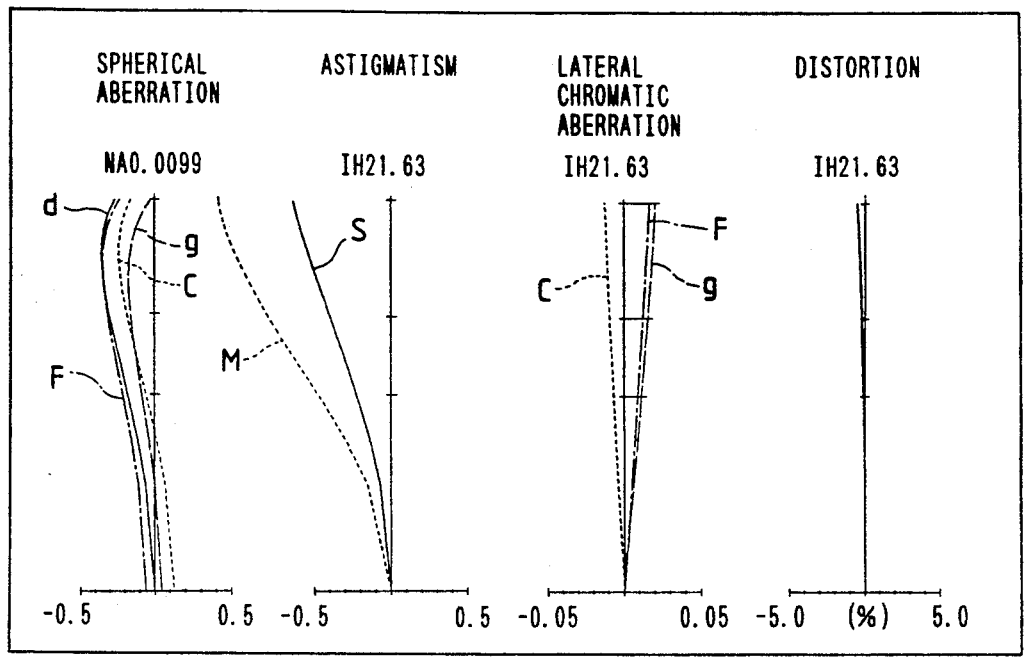
Figure 53:
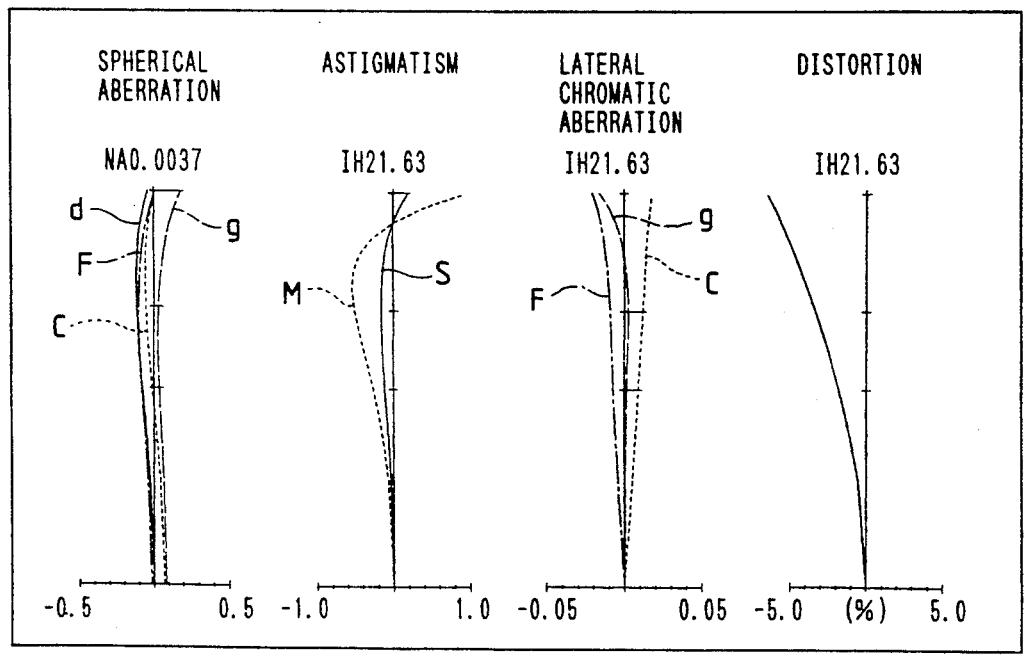
FIG. 53, FIG. 54 and FIG. 55 show curves illustrating aberration characteristics of the Embodiment 8 of the present invention when it is focused on an object located at a distance of 1.0 m by moving the third lens unit, the fourth lens unit and the fifth lens unit.
Figure 54:
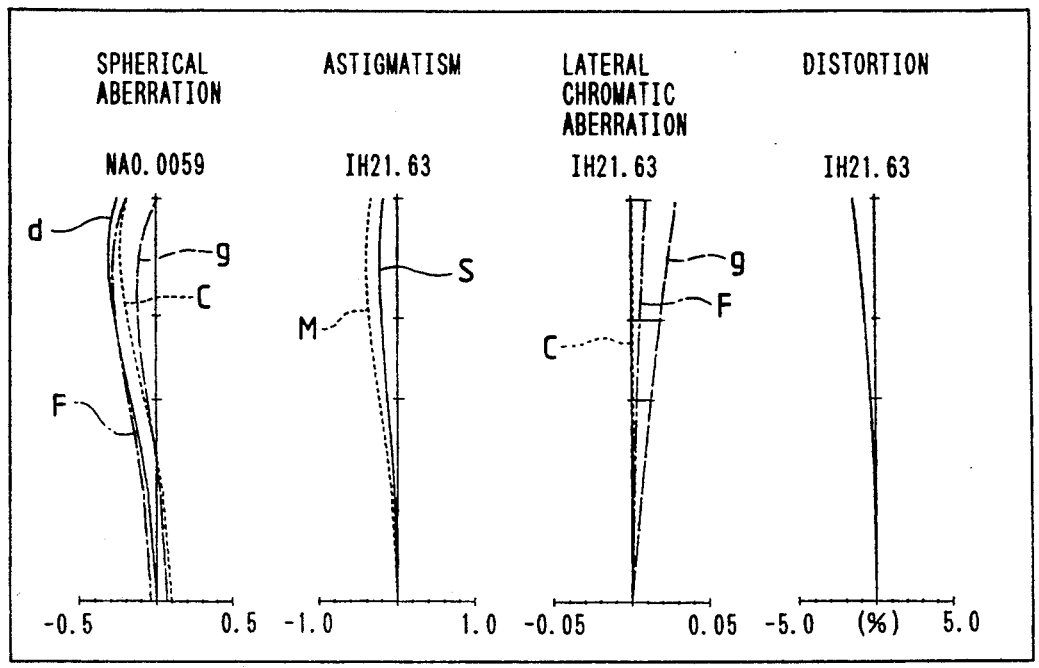
Figure 55:
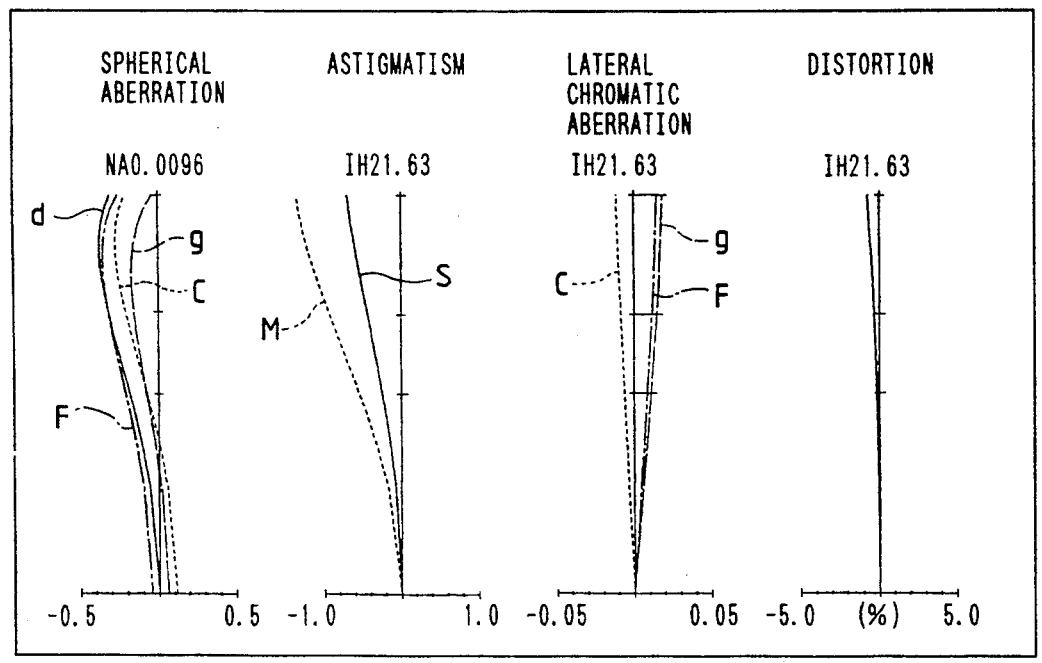

FIG. 50 through FIG. 52 illustrate aberration characteristics of the Embodiment 8 when it is focused on an object located at a short distance by moving forward both the first lens unit and the second lens unit. Further, FIG. 53 through FIG. 55 illustrate variations of aberrations in the Embodiment 8 which are caused by focusing the lens system on an object located at another short distance by moving forward the third through fifth lens units while keeping the first lens unit and the second lens unit fixed. Aberrations are aggravated little when the Embodiment 8 is focused by moving the first and second lens units or the third through fifth lens units.

When each of the focusing methods described above is to be applied to the Embodiments 1 through 8 of the present invention, the focusing lens units and the first lens unit have the refractive powers listed in the following table:

|  | W | T | W~T |
|---|---|---|---|
|  | 1st · 2nd lens units |  | 2nd lens unit |
| Embodiment 1 | −0.373 | −0.01765 | −0.06 |
| Embodiment 2 | −0.03745 | −0.0177 | −0.06098 |
| Embodiment 3 | −0.03747 | −0.01726 | −0.06108 |
| Embodiment 4 | −0.0370 | −0.01798 | −0.06037 |
| Embodiment 5 | −0.0375 | −0.01828 | −0.06 |
| Embodiment 6 | −0.03694 | −0.01766 | −0.05925 |
| Embodiment 7 | −0.04082 | −0.01853 | −0.06352 |
| Embodiment 8 | −0.0353 | −0.0163 | −0.564 |
|  | 3rd ~ 5th lens units |  | 1st lens unit |
| Embodiment 1 | 0.0359 | 0.0403 | 0.014085 |
| Embodiment 2 | 0.03508 | 0.04025 | 0.014085 |
| Embodiment 3 | 0.03522 | 0.03872 | 0.014085 |
| Embodiment 4 | 0.0351 | 0.03983 | 0.014085 |

-continued

|  | W | T | W~T |
|---|---|---|---|
| Embodiment 5 | 0.0350 | 0.03950 | 0.01421 |
| Embodiment 6 | 0.03474 | 0.03867 | 0.01440 |
| Embodiment 7 | 0.03727 | 0.043605 | 0.01472 |
| Embodiment 8 | 0.034 | 0.038 | 0.013 |

As is clear from the values of the refractive powers listed in the above table, all of the Embodiments satisfy the above-mentioned conditions (4) through (7).

When the direction along the optical axis is taken as the x axis and the direction perpendicular to the optical axis is taken as the y axis, the aspherical surfaces used in the Embodiments have shapes expressed by the following formula:

$$x = \frac{y^2/r}{1 + \sqrt{1 - (y/r)^2}} + Ey^4 + Fy^6 + Gy^8 + Hy^{10} + \ldots$$

wherein the reference symbol r represents the radius of curvature as measured on the vertex of the aspherical surface of interest, and the reference symbols E, F, G, H, ... designate the aspherical surface coefficients.

The present invention has succeeded in designing a zoom lens system which is made compacter than any of the conventional zoom lens systems by selecting a unique or adequate fundamental paraxial refractive power distribution, and imparting favorable optical performance to the zoom lens system without remarkably modifying the refractive power distribution regardless of the compacter design by composing each of the lens units of adequate thick lens elements. Further, variations of aberrations in the zoom lens system according to the present invention can be suppressed to low levels by selecting focusing methods in conjunction with types of zooming systems. Accordingly, the zoom lens system according to the present invention has a high vari-focal ratio, a compact size and excellent optical performance.

I claim:

1. A zoom lens system comprising:
    in the order from object side, a first lens unit having a positive refractive power,
    a second lens unit having a negative refractive power,
    a third lens unit having a positive refractive power,
    a fourth lens unit having a positive refractive power, and
    a fifth lens unit having a negative refractive power;
    wherein focal length of said zoom lens system as a whole is varied by moving each of said first lens unit through said fourth lens unit along the optical axis while maintaining said fifth lens unit in a substantially fixed position on the optical axis,
    wherein said zoom lens system is focused by moving at least one of said second lens unit through said fifth lens unit along the optical axis; and
    wherein each of said first lens unit through said third lens unit has an angular magnification satisfying the following condition:

$$\tau_W < \tau_T$$

wherein the reference symbol $\tau_W$ represents the angular magnification of the the first through third lens units at the wide position, and the reference symbol $\tau_T$ designates the angular magnification of the first through third lens units at the tele position.

2. A zoom lens system comprising:
in the order from object side, a first lens unit having a positive refractive power,
a second lens unit having a negative refractive power,
a third lens unit having a positive refractive power,
a fourth lens unit having a positive refractive power, and
a fifth lens unit having a negative refractive power;
wherein focal length of said zoom lens system as a whole is varied by moving each of said first lens unit through said fourth lens unit along the optical axis while maintaining said fifth lens unit in a substantially fixed position on the optical axis,
wherein said zoom lens system is focused by moving at least one of said second lens unit through said fifth lens unit along the optical axis; and
wherein said zoom lens system satisfies the following conditions:

$$|\beta_{2W}| - |\beta_{2T}| < 0 \ \beta_2 < 0$$

$$|\beta_{3W} \cdot \beta_{4W}| < |\beta_{3T} \cdot \beta_{4T}| < 0 \ \beta_3 \cdot \beta_4 < 0$$

wherein the reference symbols $\beta_{2W}$, $\beta_{3W}$ and $\beta_{4W}$ represent the lateral magnifications of the second lens unit, the third lens unit and the fourth lens unit respectively at the wide position, the reference symbols $\beta_{2T}$, $\beta_{3T}$, and $\beta_{4T}$ designate the lateral magnifications of the second lens unit, the third lens unit and the fourth lens unit respectively at the tele position, and the reference symbols $\beta_2$, $\beta_3$ and $\beta_4$ represent the lateral magnification of the second lens unit, the third lens unit and the fourth lens unit respectively.

3. A zoom lens system comprising:
in the order from object side, a first lens unit having a positive refractive power,
a second lens unit having a negative refractive power,
a third lens unit having a positive refractive power,
a fourth lens unit having a positive refractive power, and
a fifth lens unit having a negative refractive power;
wherein focal length of said zoom lens system as a whole is varied by moving each of said first lens unit through said fourth lens unit along the optical axis while maintaining said fifth lens unit in a substantially fixed position on the optical axis,
wherein said zoom lens system is focused by moving at least one of said second lens unit through said fifth lens unit along the optical axis, and
wherein the refractive power of the lens unit moved for focusing satisfies the following condition:

$$|\phi_{FW}| > \phi_1$$

wherein the reference symbol $\phi_1$ represents the refractive power of the first lens unit and the reference symbol $\phi_{FW}$ designates one of the refractive power of the focusing lens unit and the total refractive power of the focusing lens units at the wide position.

4. A zoom lens system according to claim 3 wherein said third lens unit through said fifth lens unit are moved integrally along the optical axis for focusing.

5. A zoom lens system according to claim 3 wherein said second lens unit is moved along the optical axis for focusing.

6. A zoom lens system according to claim 3 wherein said first lens unit and said second lens unit are moved integrally along the optical axis for focusing.

7. A zoom lens system according to claim 3, wherein said zoom lens system is focused by moving said first lens unit and said second lens unit integrally along the optical axis, and
wherein said first lens unit and said second lens unit satisfy the following condition:

$$|\phi_{W12}| - |\phi_{T12}| > 0$$

wherein the reference symbols $\phi_{W12}$ and $\phi_{T12}$ represent the total refractive powers of the first lens unit and the second lens unit at the wide position and the tele position respectively.

8. A zoom lens system comprising in the order from the object side: a first lens unit having a positive refractive power, a second lens unit having a negative refractive power, and comprising in the order from the object side a negative meniscus lens element having a convex surface on the object side, a negative lens element, a doublet and a negative lens element, a third lens unit having a positive refractive power, a fourth lens unit having a positive refractive power, and a fifth lens unit having a negative refractive power; adapted so as to vary the focal length of the lens system as a whole by moving said first lens unit through said fourth lens unit along the optical axis while keeping said fifth lens unit substantially fixed on the optical axis; and designed so as to satisfy the following conditions (1) through (3):

$$0.1 < |f_2/f_1| < 0.4$$

$$0.5 < |\beta_{3W} \cdot \beta_{4W}| < 2.5$$

$$1.0 < \beta_5 < 1.3$$

wherein the reference symbols $f_1$ and $f_2$ represent the focal lengths of the first lens unit and the second lens unit respectively, the reference symbols $\beta_{3W}$ and $\beta_{4W}$ designate the lateral magnifications of the third lens unit and the fourth lens unit respectively at the wide position, and the reference symbol $\beta_5$ denotes the lateral magnification of the fifth lens unit.

9. A zoom lens system comprising in the order from the object side: a first lens unit having a positive refractive power, a second lens unit having a negative refractive power, and comprising in the order from the object side a negative meniscus lens element having a convex surface on the object side, a negative meniscus lens element, a positive lens element, and a doublet having a negative refractive power and consisting of a negative lens element and a positive lens element, a third lens unit having a positive refractive power, a fourth lens unit having a positive refractive power, and a fifth lens unit having a negative refractive power; adapted so as to vary the focal length of the lens system as a whole by moving said first lens unit through said fourth lens unit along the optical axis while keeping said fifth lens unit substantially fixed on the optical axis; and designed so as to satisfy the following conditions (1) through (3):

$$0.1 < |f_2/f_1| < 0.4 \qquad (1)$$

$$0.5 < |\beta_{3W} \cdot \beta_{4W}| < 2.5 \qquad (2)$$

$$1.0 < \beta_5 < 1.3 \tag{3}$$

wherein the reference symbols $f_1$ and $f_2$ represent the focal lengths of the first lens unit and the second lens unit respectively, the reference symbols $\beta_{3W}$ and $\beta_{4W}$ designate the lateral magnifications of the third lens unit and the fourth lens unit respectively at the wide position, and the reference symbol $\beta_5$ denotes the lateral magnification of the fifth lens unit.

10. A zoom lens system comprising, in order from the object side:

a first lens unit having a positive refractive power, a second lens unit having a negative refractive power, a third lens unit having a positive refractive power, and consisting of a positive lens element and a doublet, a fourth lens unit having a positive refractive power, and a fifth lens unit having a negative refractive power, wherein focal length of the zoom lens system as a whole is varied by moving each of said first lens unit through said fourth lens unit along the optical axis while keeping said fifth lens unit substantially fixed on the optical axis; and wherein said zoom lens system satisfies the following conditions (1) through (3):

$$0.1 < |f_2/f_1| < 0.4 \tag{1}$$

$$0.5 < |\beta_{3W} \cdot \beta_{4W}| < 2.5 \tag{2}$$

$$1.0 < \beta_5 < 1.3 \tag{3}$$

wherein the reference symbols $f_1$ and $f_2$ represent the focal lengths of the first lens unit and the second lens unit respectively, the reference symbols $\beta_{3W}$ $\beta_{4W}$ designate the lateral magnifications of the third lens unit and the fourth lens unit respectively at the wide position, and the reference symbol $\beta_5$ denotes the lateral magnification of the fifth lens unit.

11. A zoom lens system comprising, in order from the object side:

a first lens unit having a positive refractive power, a second lens unit having a negative refractive power, a third lens unit having a positive refractive power, a fourth lens unit having a positive refractive power and comprising a triplet consisting of a positive lens element, a negative lens element and a positive lens element, and a fifth lens unit having a negative refractive power;

wherein focal length of the zoom lens system as a whole is varied by moving each of said first lens unit through said fourth lens unit along the optical axis while keeping said fifth lens unit substantially fixed on the optical axis; and wherein said zoom lens system satisfies the following conditions (1) through (3):

$$0.1 < |f_2/f_1| < 0.4 \tag{1}$$

$$0.5 < |\beta_{3W} \cdot \beta_{4W}| < 2.5 \tag{2}$$

$$1.0 < \beta_5 < 1.3 \tag{3}$$

wherein the reference symbols $f_1$ and $f_2$ represent the focal lengths of the first lens unit and the second lens unit respectively, the reference symbols $\beta_{3W}$ and $\beta_{4W}$ designate the lateral magnification of the third lens unit and the fourth lens unit respectively at the wide position, and the reference symbol $\beta_5$ denotes the lateral magnification of the fifth lens unit.

* * * * *